United States Patent
Kamei et al.

(10) Patent No.: US 12,402,115 B2
(45) Date of Patent: Aug. 26, 2025

(54) MANAGEMENT DEVICE, COMMUNICATION CONTROL SYSTEM, AND COMMUNICATION CONTROL METHOD

(71) Applicant: Hitachi, Ltd., Tokyo (JP)

(72) Inventors: Hiromu Kamei, Tokyo (JP); Mikio Kuwahara, Tokyo (JP); Ryo Nakano, Tokyo (JP); Ryosuke Fujiwara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/911,765

(22) PCT Filed: Feb. 14, 2022

(86) PCT No.: PCT/JP2022/005765
§ 371 (c)(1),
(2) Date: Sep. 15, 2022

(87) PCT Pub. No.: WO2023/047619
PCT Pub. Date: Mar. 30, 2023

(65) Prior Publication Data
US 2024/0215006 A1 Jun. 27, 2024

(30) Foreign Application Priority Data
Sep. 21, 2021 (JP) ................. 2021-153057

(51) Int. Cl.
*H04W 72/0457* (2023.01)
*H04L 45/851* (2022.01)
(Continued)

(52) U.S. Cl.
CPC ....... *H04W 72/0457* (2023.01); *H04L 45/851* (2022.05); *H04W 28/04* (2013.01); *H04W 48/18* (2013.01)

(58) Field of Classification Search
None
See application file for complete search history.

(56) References Cited

U.S. PATENT DOCUMENTS

2003/0073406 A1* 4/2003 Benjamin ............... H04L 67/12
340/901
2009/0022095 A1* 1/2009 Spaur .................. H04L 12/5692
370/329
(Continued)

FOREIGN PATENT DOCUMENTS

CN 111726743 A 9/2020
JP 2001-285166 A 10/2001
(Continued)

OTHER PUBLICATIONS

International Search Report and Written Opinion, Application No. PCT/JP2022/005765, issued Apr. 5, 2022. 10 pages.
(Continued)

*Primary Examiner* — Clemence S Han
(74) *Attorney, Agent, or Firm* — Volpe Koenig

(57) ABSTRACT

To determine a communication path satisfying communication requirements depending on an operation of an application, it is provided a management device for selecting a communication path that satisfies communication requirements for an application operating on a terminal, the management device comprising: an event detection module configured to detect, as an event, one of an operation change, an increase, or a decrease of the application which is accompanied by a change in the communication requirements; app information for managing the communication requirements for each operation of the application; communication path information for managing communication quality of each communication path; and a communication control method calculation module configured to determine, by referring to the app information and the communication
(Continued)

path information, a communication control method that satisfies the communication requirements for the application from which the event has been detected, and notify a communication control device of the determined communication control method.

13 Claims, 20 Drawing Sheets

(51) Int. Cl.
*H04W 28/04* (2009.01)
*H04W 48/18* (2009.01)

(56) References Cited

U.S. PATENT DOCUMENTS

| | | | | |
|---|---|---|---|---|
| 2010/0105332 | A1* | 4/2010 | McHenry | H04W 16/14 |
| | | | | 455/62 |
| 2010/0128698 | A1 | 5/2010 | Ishizu et al. | |
| 2013/0331108 | A1* | 12/2013 | Otomo | H04W 40/12 |
| | | | | 455/445 |
| 2014/0056154 | A1* | 2/2014 | Agarwal | H04W 72/53 |
| | | | | 370/252 |
| 2014/0369182 | A1 | 12/2014 | De Blasio et al. | |
| 2015/0056960 | A1* | 2/2015 | Egner | H04W 4/027 |
| | | | | 455/411 |
| 2015/0215935 | A1* | 7/2015 | Taira | H04W 28/0236 |
| | | | | 370/336 |
| 2017/0272972 | A1* | 9/2017 | Egner | H04L 47/2441 |
| 2017/0359131 | A1* | 12/2017 | Mashimo | H04L 69/14 |
| 2019/0081889 | A1* | 3/2019 | Fieau | H04L 45/24 |
| 2019/0228863 | A1* | 7/2019 | Dharwad | G16H 20/17 |
| 2021/0184702 | A1* | 6/2021 | Sandoval | H04L 45/124 |
| 2021/0234778 | A1* | 7/2021 | Bendigeri | H04L 69/14 |
| 2021/0235311 | A1* | 7/2021 | Soma | H04L 45/245 |
| 2021/0281336 | A1 | 9/2021 | Upadhya et al. | |
| 2021/0400561 | A1* | 12/2021 | Ginthoer | H04W 40/12 |
| 2022/0256591 | A1* | 8/2022 | Wang | H04W 74/002 |
| 2022/0278891 | A1* | 9/2022 | Damnjanovic | H04W 76/30 |
| 2023/0006748 | A1* | 1/2023 | Ryu | H04B 17/3913 |
| 2023/0055926 | A1* | 2/2023 | Zhou | H04L 1/0009 |
| 2023/0189355 | A1* | 6/2023 | Damnjanovic | H04W 76/10 |
| | | | | 370/329 |
| 2023/0209588 | A1* | 6/2023 | Hoshino | H04W 28/0967 |
| | | | | 370/329 |

FOREIGN PATENT DOCUMENTS

| | | |
|---|---|---|
| JP | 2002-271514 A | 9/2002 |
| JP | 2003-169375 A | 6/2003 |
| JP | 2010-124374 A | 6/2010 |
| JP | 2012-15725 A | 1/2012 |
| JP | 2012-209787 A | 10/2012 |
| JP | 2014-530531 A | 11/2014 |
| JP | 2021-141579 A | 9/2021 |
| WO | 2013/041307 A1 | 3/2013 |
| WO | 2020/177333 A1 | 9/2020 |

OTHER PUBLICATIONS

Japanese Office Action issued on Dec. 3, 2024 for Japanese Patent Application No. 2021-153057.

* cited by examiner

| APP ID | OPERATION TYPE | SOURCE DEVICE ID | DESTINATION DEVICE ID | SOURCE IPv4:PORT | DESTINATION IPv4:PORT | THROUGHPUT | LATENCY | PACKET LOSS RATE | COST UPPER LIMIT | PRIORITY |
|---|---|---|---|---|---|---|---|---|---|---|
| VEHICLE CONTROL | NORMAL MODE | #1 | #2 | 10.0.0.1:1000 | 20.0.0.1:2000 | 30Mbps | 30ms | $10^{-4}$ | 100 | 2 |
| | EMERGENCY MODE | #1 | #2 | 10.0.0.1:1000 | 20.0.0.1:2000 | 60Mbps | 30ms | $10^{-4}$ | 100 | 2 |
| GPS | NORMAL MODE | #1 | #2 | 10.0.0.1:1001 | 20.0.0.1:2001 | 1Mbps | 80ms | $10^{-4}$ | 100 | 3 |
| COMMUNICATION CONTROL | NORMAL MODE | #1 | #2 | 10.1.0.1:8000 | 20.1.0.1:9000 | 1Mbps | 10ms | $10^{-9}$ | 100 | 1 |
| VEHICLE CONTROL | NORMAL MODE | #2 | #1 | 20.0.0.1:2000 | 10.0.0.1:1000 | 1Mbps | 30ms | $10^{-4}$ | 100 | 2 |
| | EMERGENCY MODE | #2 | #1 | 20.0.0.1:2001 | 10.0.0.1:1000 | 1Mbps | 30ms | $10^{-4}$ | 100 | 2 |
| GPS | NORMAL MODE | #2 | #1 | 20.0.0.1:2001 | 10.0.0.1:1001 | 1Mbps | 80ms | $10^{-4}$ | 100 | 3 |
| COMMUNICATION CONTROL | NORMAL MODE | #2 | #1 | 20.1.0.1:9000 | 10.1.0.1:8000 | 1Mbps | 10ms | $10^{-9}$ | 100 | 1 |

901

APP REQUIREMENT TABLE

Fig. 9A

| APP ID | OPERATION TYPE | DATA TYPE | SOURCE DEVICE ID | DESTINATION DEVICE ID | SOURCE IPv4:PORT | DESTINATION IPv4:PORT | THROUGHPUT | LATENCY | PACKET LOSS RATE | COST UPPER LIMIT | PRIORITY |
|---|---|---|---|---|---|---|---|---|---|---|---|
| VEHICLE CONTROL | NORMAL MODE | VIDEO DATA | #1 | #2 | 10.0.0.1:1000 | 20.0.0.1:2000 | 25Mbps | 30ms | $10^{-4}$ | 100 | 3 |
| | | CONTROL DATA | #1 | #2 | 10.0.0.1:1000 | 20.0.0.1:2000 | 5Mbps | 50ms | $10^{-4}$ | 100 | 2 |
| | EMERGENCY MODE | VIDEO DATA | #1 | #2 | 10.0.0.1:1000 | 20.0.0.1:2000 | 55Mbps | 30ms | $10^{-4}$ | 100 | 3 |
| | | CONTROL DATA | #1 | #2 | 10.0.0.1:1000 | 20.0.0.1:2000 | 5Mbps | 50ms | $10^{-4}$ | 100 | 2 |
| GPS | NORMAL MODE | - | #1 | #2 | 10.0.0.1:1001 | 20.0.0.1:2001 | 1Mbps | 80ms | $10^{-4}$ | 100 | 4 |
| COMMUNICATION CONTROL | NORMAL MODE | - | #1 | #2 | 10.1.0.1:8000 | 20.1.0.1:9000 | 1Mbps | 10ms | $10^{-9}$ | 100 | 1 |

APP REQUIREMENT TABLE

*Fig. 10*

| APP ID | OPERATION TYPE | SOURCE DEVICE ID | DESTINATION DEVICE ID | SOURCE IPv4:PORT | DESTINATION IPv4:PORT | THROUGH-PUT | LATENCY | PACKET LOSS RATE | COST UPPER LIMIT | PRIORITY | OPTIMIZATION ITEM |
|---|---|---|---|---|---|---|---|---|---|---|---|
| VEHICLE CONTROL | NORMAL MODE | #1 | #2 | 10.0.0.1:1000 | 20.0.0.1:2000 | 25Mbps | 30ms | $10^{-4}$ | 100 | 2 | MINIMUM COST |
|  | EMERGENCY MODE | #1 | #2 | 10.0.0.1:1000 | 20.0.0.1:2000 | 55Mbps | 30ms | $10^{-4}$ | 100 | 2 | MINIMUM LATENCY |
| GPS | NORMAL MODE | #1 | #2 | 10.0.0.1:1001 | 20.0.0.1:2001 | 1Mbps | 80ms | $10^{-4}$ | 100 | 3 | MINIMUM PACKET LOSS RATE |
| COMMUNICATION CONTROL | NORMAL MODE | #1 | #2 | 10.1.0.1:8000 | 20.1.0.1:9000 | 1Mbps | 10ms | $10^{-9}$ | 100 | 1 | MINIMUM COST |

APP REQUIREMENT TABLE

*Fig. 11*

| COMMUNICATION PATH ID | SOURCE DEVICE ID | DESTINATION DEVICE ID | MAXIMUM BANDWIDTH | LATENCY | PACKET LOSS RATE | POWER CONSUMPTION [mW/h] | USAGE FEE [YEN/MB] | COST |
|---|---|---|---|---|---|---|---|---|
| LTE | #1 | #2 | 50Mbps | 30ms | $10^{-4}$ | 1 | 150 | 15 |
| 5G | #1 | #2 | 100Mbps | 10ms | $10^{-6}$ | 1.5 | 200 | 30 |
| WiFi | #1 | #2 | 200Mbps | 10ms | $10^{-3}$ | 1 | 100 | 10 |
| LTE | #2 | #1 | 10Mbps | 30ms | $10^{-4}$ | 1 | 150 | 15 |
| 5G | #2 | #1 | 20Mbps | 10ms | $10^{-6}$ | 1.5 | 200 | 30 |
| WiFi | #2 | #1 | 40Mbps | 10ms | $10^{-3}$ | 1 | 100 | 10 |

COMMUNICATION PATH TABLE

*Fig. 12*

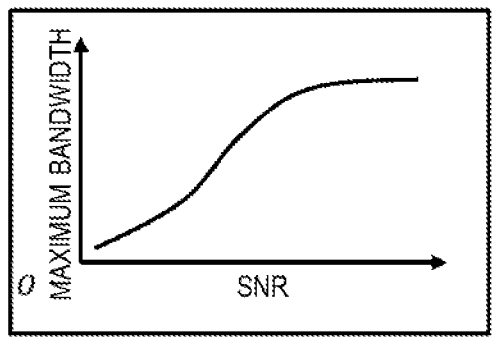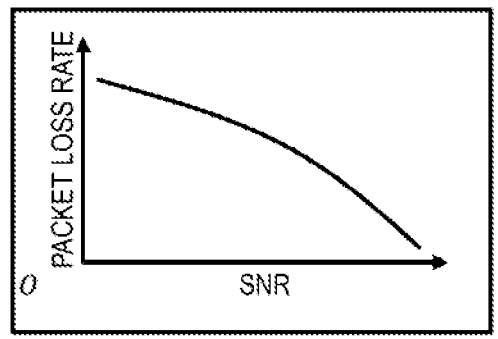
Fig. 13
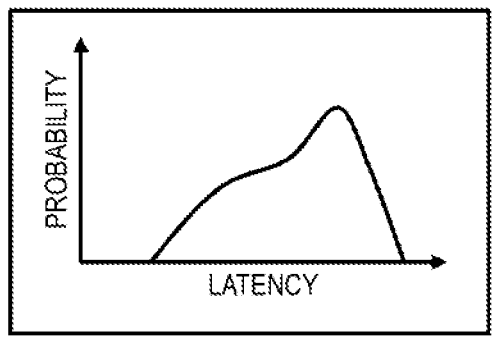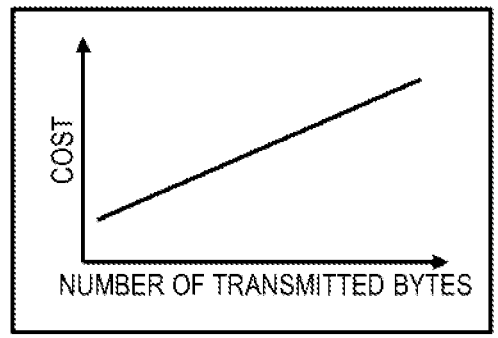
Fig. 14

| COMMUNICATION PATH ID LIST | SOURCE DEVICE ID | DESTINATION DEVICE ID | PATH REDUNDANCY | CARRIER AGGREGATION | FEC | SUCCESSIVE TRANSMISSION CONTROL | MAXIMUM BANDWIDTH (AVAILABLE BANDWIDTH) | LATENCY | PACKET LOSS RATE | COST |
|---|---|---|---|---|---|---|---|---|---|---|
| LTE | #1 | #2 | N/A | N/A | N/A | N/A | 50Mbps | 30ms | $10^{-4}$ | 15 |
| 5G | #1 | #2 | N/A | N/A | N/A | N/A | 100Mbps | 10ms | $10^{-6}$ | 30 |
| WiFi | #1 | #2 | N/A | N/A | N/A | N/A | 200Mbps | 10ms | $10^{-3}$ | 10 |
| LTE | #1 | #2 | N/A | N/A | O (CODING RATE: 3/5) | O (2 SUCCESSIVE TRANSMISSIONS) | 25Mbps | 30ms | $10^{-8}$ | 30 |
| LTE | #1 | #2 | N/A | N/A | N/A | N/A | 30Mbps | 30ms | $10^{-6}$ | 25 |
| LTE, 5G | #1 | #2 | N/A | O | N/A | N/A | 150Mbps | 20ms | $10^{-5}$ | 22.5 |
| LTE, 5G | #1 | #2 | O | N/A | N/A | N/A | 50Mbps | 10ms | $10^{-10}$ | 45 |

CALCULATED COMMUNICATION PATH LIST

*Fig. 15*

| APP ID | OPERATION STATE | ACCOMMODATABILITY | SOURCE DEVICE ID | DESTINATION DEVICE ID | SOURCE IPv4:PORT | DESTINATION IPv4:PORT |
|---|---|---|---|---|---|---|
| VEHICLE CONTROL | NORMAL MODE | O | #1 | #2 | 10.0.0.1:1000 | 20.0.0.1:2000 |
| GPS | NORMAL MODE | O | #1 | #2 | 10.0.0.1:1001 | 20.0.0.1:2001 |
| COMMUNICATION CONTROL | NORMAL MODE | O | #1 | #2 | 10.1.0.1:8000 | 20.1.0.1:9000 |

COMMUNICATION CONTROL METHOD (VEHICLE CONTROL APP IN NORMAL MODE)

| PATH REDUNDANCY | CARRIER AGGREGATION | FEC | SUCCESSIVE TRANSMISSION CONTROL | TRAFFIC ALLOCATION |
|---|---|---|---|---|
| N/A | N/A | N/A | N/A | LTE:30Mbps |
| N/A | N/A | N/A | N/A | LTE:1Mbps |
| O (5G, WiFi) | N/A | N/A | N/A | 5G:1Mbps, WiFi:1Mbps |

*Fig. 16A*

| APP ID | OPERATION STATE | ACCOMMODATABILITY | SOURCE DEVICE ID | DESTINATION DEVICE ID | SOURCE IPv4:PORT | DESTINATION IPv4:PORT |
|---|---|---|---|---|---|---|
| VEHICLE CONTROL | EMERGENCY MODE | O | #1 | #2 | 10.0.0.1:1000 | 20.0.0.1:2000 |
| GPS | NORMAL MODE | O | #1 | #2 | 10.0.0.1:1001 | 20.0.0.1:2001 |
| COMMUNICATION CONTROL | NORMAL MODE | O | #1 | #2 | 10.1.0.1:8000 | 20.1.0.1:9000 |

COMMUNICATION CONTROL METHOD (VEHICLE CONTROL APP IN EMERGENCY MODE) 1601-B

| PATH REDUNDANCY | CARRIER AGGREGATION | FEC | SUCCESSIVE TRANSMISSION CONTROL | TRAFFIC ALLOCATION |
|---|---|---|---|---|
| N/A | O(LTE, 5G) | N/A | N/A | LTE:30Mbps, 5G:30Mbps |
| N/A | N/A | N/A | N/A | LTE:1Mbps |
| O (5G, WiFi) | N/A | N/A | N/A | 5G:1Mbps, WiFi:1Mbps |

Fig. 16B

CONTROL STATUS DISPLAY SCREEN

[COMMUNICATION PATH STATUS] (1701)

| COMMUNICATION PATH ID | SOURCE DEVICE ID | DESTINATION DEVICE ID | MAXIMUM BANDWIDTH | LATENCY | PACKET LOSS RATE | COST |
|---|---|---|---|---|---|---|
| LTE | #1 | #2 | 50Mbps | 30ms | $10^{-4}$ | 15 |
| 5G | #1 | #2 | 100Mbps | 10ms | $10^{-6}$ | 30 |
| WiFi | #1 | #2 | 200Mbps | 10ms | $10^{-3}$ | 10 |

[COMMUNICATION CONTROL STATUS] (1702)

| APP ID | OPERATION STATE | ACCOMMODATABILITY | SOURCE DEVICE ID | DESTINATION DEVICE ID | SOURCE IPv4:PORT | DESTINATION IPv4:PORT | PATH REDUNDANCY | CARRIER AGGREGATION | FEC | SUCCESSIVE TRANSMISSION CONTROL | TRAFFIC ALLOCATION | COST |
|---|---|---|---|---|---|---|---|---|---|---|---|---|
| VEHICLE CONTROL | NORMAL MODE | ○ | #1 | #2 | 10.0.0.1:1000 | 20.0.0.1:2000 | N/A | N/A | N/A | N/A | LTE:30Mbps | 15 |
| GPS | NORMAL MODE | ○ | #1 | #2 | 10.0.0.1:1001 | 20.0.0.1:2001 | N/A | N/A | N/A | N/A | LTE:1Mbps | 15 |
| COMMUNICATION CONTROL | NORMAL MODE | ○ | #1 | #2 | 10.1.0.1:8000 | 20.1.0.1:9000 | ○ (5G, WiFi) | N/A | N/A | N/A | 5G:1Mbps, WiFi:1Mbps | 40 |

[NEW COMMUNICATION PATH INPUT PART] 1801

| COMMUNICATION PATH ID | SOURCE DEVICE ID | DESTINATION DEVICE ID | MAXIMUM BANDWIDTH | LATENCY | PACKET LOSS RATE | POWER CONSUMPTION [mW/h] | USAGE FEE [MB/YEN] | COST |
|---|---|---|---|---|---|---|---|---|
| | | | | | | | | |

1802 ADD NEW COMMUNICATION PATH

[NEW APP INPUT PART]

| APP ID | OPERATION TYPE | SOURCE DEVICE ID | DESTINATION DEVICE ID | SOURCE IPv4:PORT | DESTINATION IPv4:PORT |
|---|---|---|---|---|---|
| | | | | | |

| REQUESTED BANDWIDTH | REQUESTED LATENCY | REQUESTED PACKET LOSS RATE | REQUESTED COST UPPER LIMIT | PRIORITY |
|---|---|---|---|---|
| | | | | |

1803

1804 ADD NEW APP

| APP ID | OPERATION STATE BEFORE CHANGE | OPERATION STATE AFTER CHANGE | INFORMATION SOURCE | CHANGE DETECTION CONDITION |
|---|---|---|---|---|
| VEHICLE CONTROL | NORMAL MODE | EMERGENCY MODE | IN-VEHICLE CAMERA | OBSTRUCTION IS DETECTED |
| VEHICLE CONTROL | EMERGENCY MODE | ORMAL MODE | IN-VEHICLE CAMERA | OBSTRUCTION IS NOT DETECTED |

APP OPERATION CHANGE DETECTION TABLE

| COMMUNICATION PATH ID | INDEX | CHANGE DETECTION CONDITION |
|---|---|---|
| LTE | LATENCY | VALUE HAS BEEN CHANGED BY 10% OR MORE FROM PREVIOUS SAMPLE |
| LTE | PACKET LOSS RATE | COMMUNICATION CONGESTION IS DETECTED |

COMMUNICATION PATH CHANGE DETECTION TABLE

MANAGEMENT DEVICE, COMMUNICATION CONTROL SYSTEM, AND COMMUNICATION CONTROL METHOD

CLAIM OF PRIORITY

The present application claims priority from Japanese patent application JP 2021-153057 filed on Sep. 21, 2021, the content of which is hereby incorporated by reference into this application.

BACKGROUND OF THE INVENTION

This invention relates to a management device, a communication control system, and a communication control method for a multi-access network.

In recent years, with development of wireless communication systems, it has become possible to provide high-quality wireless networks having large capacity and low latency. Thus, use of wireless communication systems is being investigated even in applications that require high communication quality, such as remote medical services and remote robot control, which have hitherto been difficult to achieve. Of the applications described above, wireless communication systems are expected to be applied particularly to mission-critical purposes that require high reliability.

Meanwhile, it is difficult to guarantee high reliability of wireless communication at all times due to characteristics thereof. The wireless communication causes strength of received radio waves to fluctuate due to reflection and attenuation of radio waves caused by terrains and objects, and becomes difficult to be carried out depending on a state of a terminal.

As a related art for solving such problems, Patent literature 1 (JP 2012-15725 A) is known. The Patent literature 1 relates to a technology in which a plurality of communication systems, such as a public mobile communication system, a wireless local area network (LAN), and a wired LAN, are used by being switched depending on a communication environment and an application. For example, in the Patent literature 1, there is described a wireless transmission device including: a plurality of wireless modules that perform wireless transmission in mutually different schemes; a switch unit that switches the wireless modules to be operated between the wireless modules; a content information notification unit that outputs information for identifying content to be transmitted and information accompanying the content to be transmitted; and an app recognition unit that determines priorities of the respective wireless modules based on the information for identifying content to be transmitted and the information accompanying the content to be transmitted and outputs the determined priorities to the switch unit, in which the switch unit selects any one of the wireless modules based on the priority.

SUMMARY OF THE INVENTION

With the technology as described in the Patent literature 1, a plurality of communication systems can be switched to be used depending on the communication environment and the content of an application. Meanwhile, when an application operates by switching different communication requirements (including throughput and latency) in, for example, a video distribution service that allows users to select and view videos with any resolution, it is required to perform control depending on a change in an operation of the application. Therefore, it is required to accurately detect a change in the operation of the application. With the technology as described in the Patent literature 1, which does not have the above-mentioned mechanism, there are some cases in which the communication requirements cannot be satisfied when the operation of the application changes.

This invention has an object to provide a communication control system and a management device which determine a communication path that satisfies communication requirements depending on an operation of an application in a scheme in which a plurality of communication systems are used by switching communication paths in an adaptive manner depending on a communication environment and the like.

The representative one of inventions disclosed in this application is outlined as follows. There is provided a management device for selecting a communication path that satisfies communication requirements for an application operating on a terminal, the management device comprising: an event detection module configured to detect, as an event, one of an operation change, an increase, or a decrease of the application which is accompanied by a change in the communication requirements; app information for managing the communication requirements for each operation of the application; communication path information for managing communication quality of each communication path; and a communication control method calculation module configured to determine, by referring to the app information and the communication path information, a communication control method that satisfies the communication requirements for the application from which the event has been detected, and notify a communication control device of the determined communication control method.

According to the at least one aspect of this invention, it is possible to select, depending on the operation of an application, a communication path that satisfies communication requirements corresponding to the operation of the application.

Problems, configurations, and effects other than those described above become apparent based on the following description of at least one embodiment of this invention.

BRIEF DESCRIPTION OF THE DRAWINGS

FIG. 9A and FIG. 9B are diagrams for illustrating examples of structure of tables managed by an app information database according to the first embodiment.

FIG. 10 is a diagram for illustrating an example of structure of a table managed by the app information database for a case in which a plurality of different types of traffic are transmitted by each application.

FIG. 11 is a diagram for illustrating an example of structure of a table managed by the app information database 405 for a case of performing the communication control corresponding to the optimization item.

FIG. 12 is a diagram for illustrating an example of structure of a table managed by a communication path database according to the first embodiment.

FIG. 13 is a diagram for illustrating a communication path quality calculation function for converting measured information into communication quality information according to the first embodiment.

FIG. 14 is a diagram for illustrating communication quality information shown in a function format according to the first embodiment.

FIG. 15 is a diagram for illustrating examples of the communication path calculated by the communication control method calculation module of the management device according to the first embodiment.

FIG. 16A and FIG. 16B are diagrams for illustrating examples of the communication control method determined by the communication control method calculation module of the management device according to the first embodiment.

FIG. 17 is a diagram for illustrating an example of a screen to be displayed by a control status display module according to the first embodiment.

FIG. 18 is a diagram for illustrating an example of an input screen to be used by an input module according to the first embodiment.

DETAILED DESCRIPTION OF THE PREFERRED EMBODIMENTS

Figure 1:
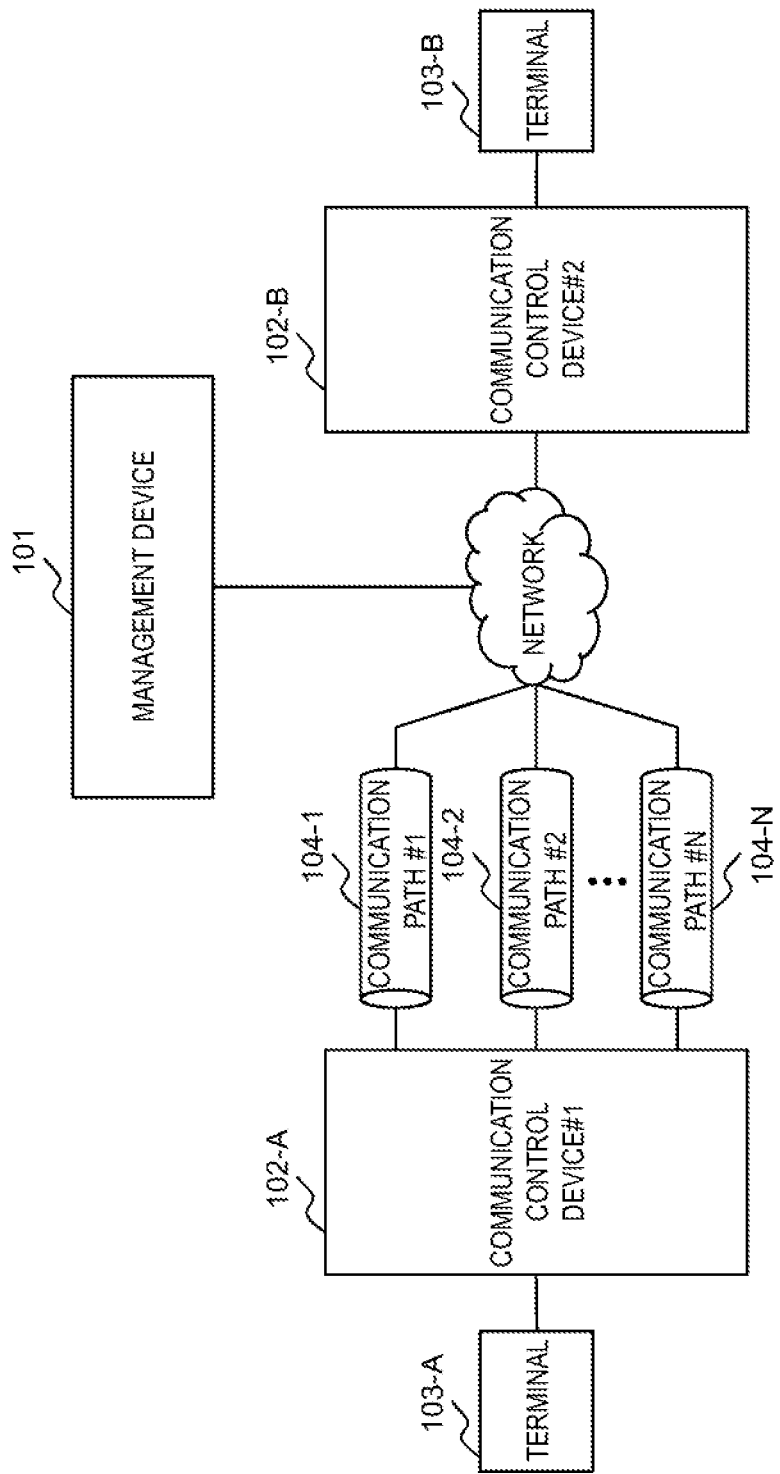
FIG. 1 is a diagram for illustrating an example of an overall configuration of a communication control system according to a first embodiment.

Now, description is given of at least one embodiment of this invention referring to the drawings. It should be noted that this invention is not to be construed by limiting the invention to the content described in the following at least one embodiment. The at least one embodiment is merely an example, and this invention can be carried out in a mode in which various modifications and improvements are made thereto based on knowledge of a person skilled in the art. In this specification and the accompanying drawings, like components are denoted by like reference numerals and symbols. Further, components that are not required to be described separately from each other are described collectively without a suffix (as, for example, "communication control devices 102"), and components that are required to be described separately from each other are described with suffixes (as, for example, "communication control device 102-A" and "communication control device 102-B").

First Embodiment

FIG. 1 is a diagram for illustrating an example of an overall configuration of a communication control system according to a first embodiment of this invention.

The communication control system includes: a management device 101 that calculates a communication control method with triggers of an update of a database for communication control and a change in an operation of an application; and the communication control devices 102 that each control, based on setting calculated by the management device 101, traffic transmitted from an application on a terminal 103. The management device 101 and the communication control device 102 are coupled through at least one of communication paths 104 and a network such as the Internet in order to enable exchange of information including the communication control method.

The communication control devices 102 are coupled to each other by one or more communication paths 104. Selection of a communication path and control such as path redundancy for duplicating packets and transmitting the packets to a plurality of communication paths are performed depending on communication quality, such as throughput or latency, of the communication path 104, thereby being capable of satisfying communication requirements for various applications. As the communication path 104, any one of a wired manner or a wireless manner can be selected, and, for example, Ethernet (trademark), LTE (trademark), Wi-Fi (trademark), or 5G can be configured.

Each terminal 103 is coupled to each communication control device 102 in a wired manner or a wireless manner. As an example other than illustrated in FIG. 1, the communication control device 102-B may include a plurality of communication paths 104. The management device 101 and each communication control device 102 may be coupled by a dedicated communication path. A plurality of terminals 103 may be coupled through a network switch or the like. The terminal 103 and the communication control device 102 may be implemented by hardware having the same configuration, and the management device 101 and the communication control device 102 may be implemented by hardware having the same configuration.

Figure 2:
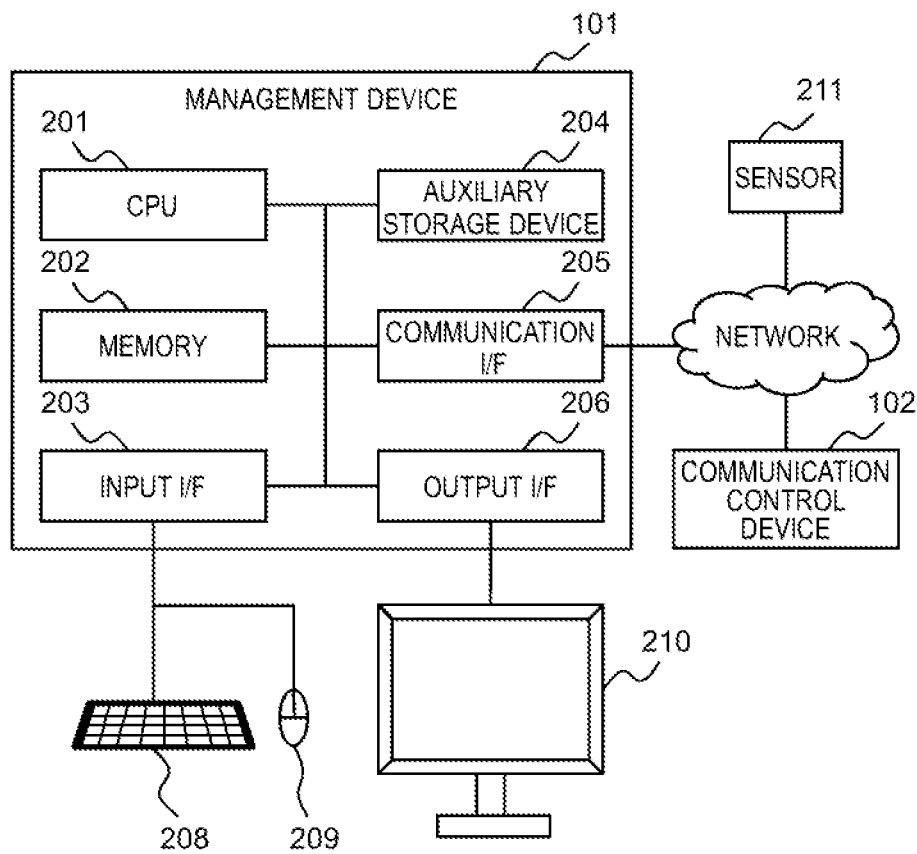
FIG. 2 is a block diagram for illustrating an example of a hardware configuration of the management device according to the first embodiment.

FIG. 2 is a block diagram for illustrating an example of a hardware configuration of the management device 101 according to the first embodiment.

The management device 101 according to the first embodiment is formed of a computer including a processor (central processor unit (CPU)) 201, a memory 202, an auxiliary storage device 204, and a communication interface 205. The management device 101 may include an input interface 203 and an output interface 206.

The processor 201 is an arithmetic device that executes programs stored in the memory 202. The processor 201 executes various programs, to thereby implement each of functions of the device. Part of processing carried out by the processor 201 by executing programs may be executed by another arithmetic device (for example, application specific integrated circuit (ASIC), field programmable gate array (FPGA), or similar piece of hardware).

The memory 202 includes a read only memory (ROM), which is a non-volatile storage element, and a random access memory (RAM), which is a volatile storage element. The ROM stores an unchanging program (for example, basic input output system (BIOS)) among others. The RAM is a dynamic random access memory (DRAM) or a similar high-speed and volatile storage element, and temporality stores a program to be executed by the processor 201 and data to be used when the program is executed.

The auxiliary storage device 204 is, for example, a large-capacity and non-volatile storage device, such as a magnetic storage device (hard disk drive (HDD)) or a flash memory (solid state drive (SSD)). The auxiliary storage device 204 also stores a program to be executed by the processor 201 and data to be used by the processor 201 when the program is executed. In other words, the program is read out from the auxiliary storage device 204, loaded into the memory 202, and executed by the processor 201, to thereby implement each of the functions of the device.

The communication interface 205 is a network interface device that controls communication to and from other devices (for example, the communication control device 102) in accordance with a given protocol. A sensor 211 is coupled to the communication interface 205. The sensor 211 detects at least one of a state of a network, a state of a process, or external information (for example, time, location information, acceleration, brightness, sound, image, vibration, or angular velocity) that serves as an event for an operation change of an application. The operation change of an application includes a change in an application operation state, an increase due to new execution of the application, and a decrease due to stopping of the execution of the application. The sensor 211 may be coupled to the input interface 203.

The input interface 203 is an interface to which input devices, such as a keyboard 208 and a mouse 209, are coupled and which receives input from the outside. The output interface 206 is an interface to which output devices, such as a display device 210 and a printer (not shown), are coupled and which outputs an execution result of a program in a format that can be visually recognized by a user. An input device (for example, sensor 211) and an output device that are coupled to the management device 101 through a network may input and output data. In this case, the management device 101 may have a web server function, and the input device and the output device may access the management device 101 through a predetermined protocol (for example, http).

A program to be executed by the processor 201 is provided to the management device 101 through a removable medium (compact disc-read only memory (CD-ROM), flash memory, or the like) or a network, and is stored on the non-volatile auxiliary storage device 204, which is a non-transitory storage medium. It is therefore preferred for the management device 101 to include an interface through which data is read from a removable medium.

The management device 101 may operate on one physical computer, or may operate on a virtual computer built from a plurality of physical resources in a computer system that includes a plurality of logically or physically configured computers.

Figure 3:
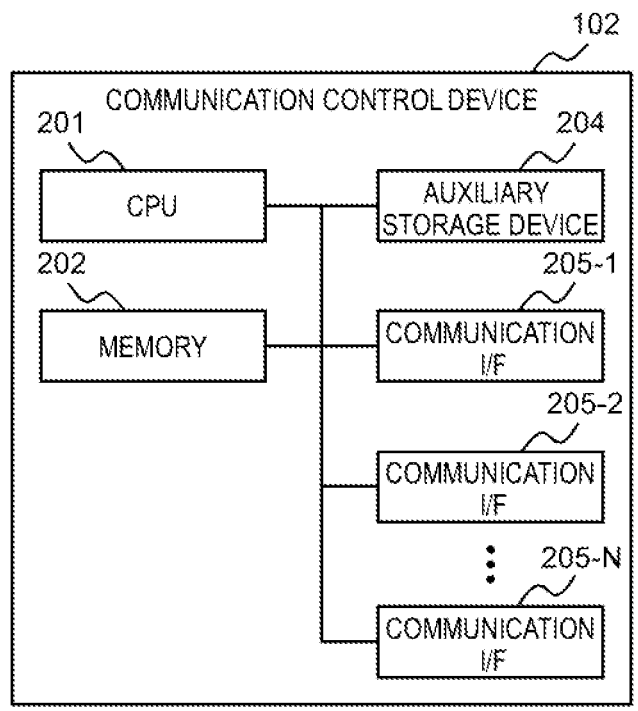
FIG. 3 is a block diagram for illustrating an example of a hardware configuration of the communication control device according to the first embodiment.

FIG. 3 is a block diagram for illustrating an example of a hardware configuration of the communication control device 102 according to the first embodiment. The communication control device 102 in the first embodiment is formed of a computer including a processor 201, a memory 202, an auxiliary storage device 204, and a communication interface 205. Functions of the respective components are the same as those illustrated in FIG. 2, and hence detailed descriptions are omitted. An input/output interface may be provided in addition to the components illustrated in FIG. 3.

Figure 4:
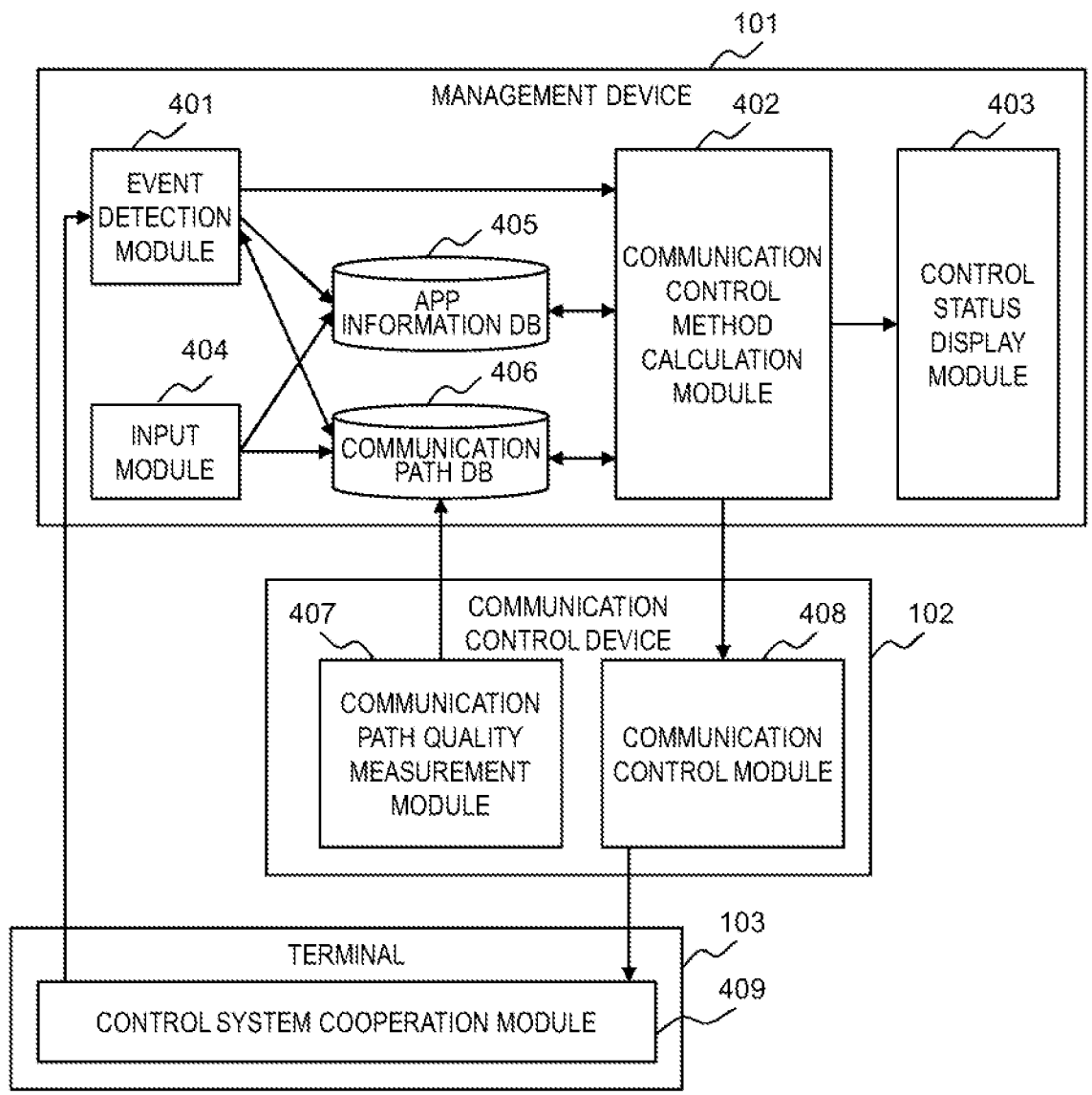
FIG. 4 is a logical block diagram for illustrating an example of a software configuration of each device according to the first embodiment.

FIG. 4 is a logical block diagram for illustrating an example of a software configuration of each device according to the first embodiment.

The management device 101 includes an event detection module 401 that detects the operation change of an application, a communication control method calculation module 402 that calculates the communication control method, a control status display module 403 that displays a current communication control status to the user, an input module 404 that inputs details of a DB, an app information database 405 that holds information relating to applications to be used for calculating the communication control method, and a communication path database 406 that holds information relating to communication paths to be similarly used for calculating the communication control method.

The communication control device 102 includes a communication path quality measurement module 407 that periodically measures information relating to the quality of the communication path and a communication control module 408 that performs communication control. Examples of the quality of the communication path include throughput, latency, and a packet loss rate.

The terminal 103 includes a control system cooperation module 409 that notifies the management device 101 that the operation of the application has changed.

In the first embodiment, the event detection module 401 of the management device 101 uses an app operation change notification 601, which is described later with reference to FIG. 6, transmitted from the terminal 103 to detect the operation change of the application, and requests the communication control method calculation module 402 to calculate the communication control method. This enables the communication control corresponding to the operation of the application. A processing procedure for the communication control is specifically described with reference to FIG. 5.

Figures 5, 6:
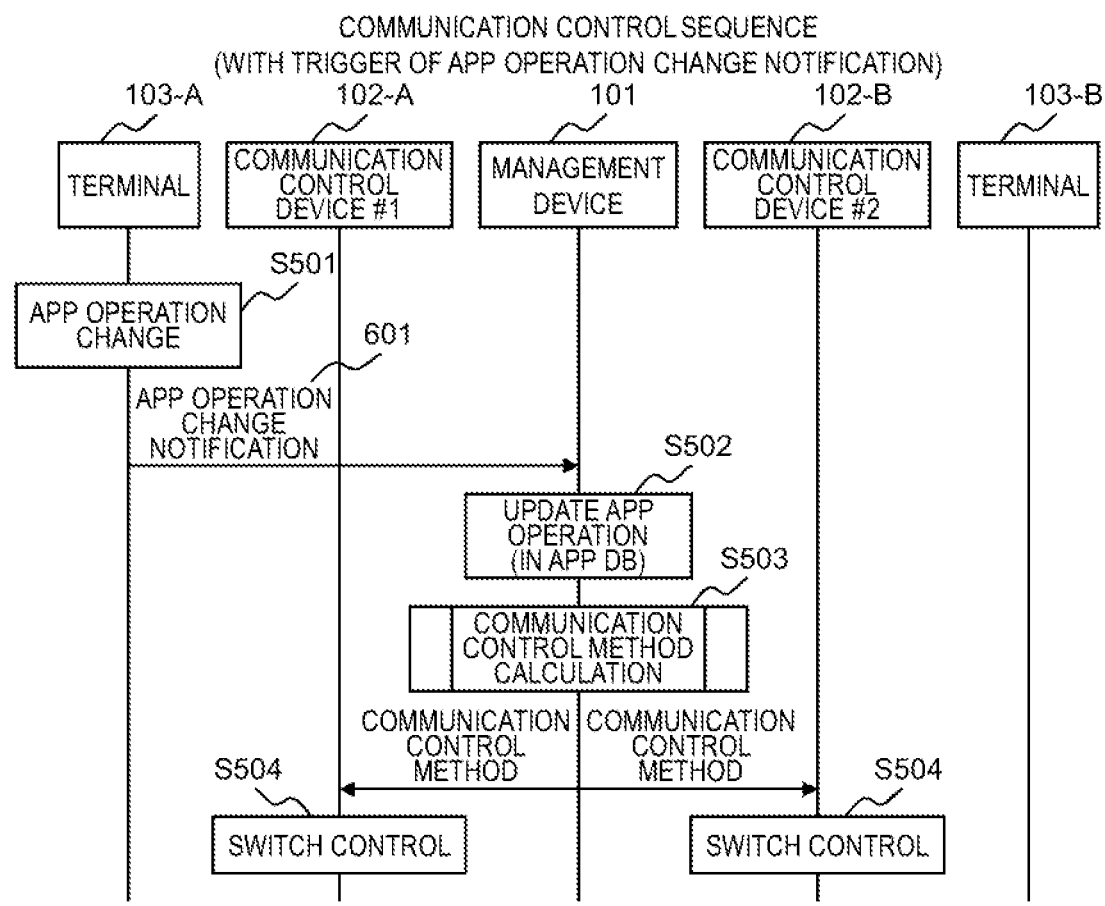
FIG. 5 is a sequence diagram for illustrating an example of communication control processing at a time of an operation change of an application according to the first embodiment.
FIG. 6 is a diagram for illustrating a format example of the app operation change notification.

FIG. 5 is a sequence diagram for illustrating an example of communication control processing at a time of the operation change of the application according to the first embodiment. Specific steps thereof are described below.

Step S501: The terminal 103 causes the control system cooperation module 409 to detect the operation change of the application, and transmits the app operation change notification 601 to the management device 101. The control system cooperation module 409 detects the operation change of the application by, for example, monitoring the state of a process or the input and output of a network interface being used by the application or receiving a notification from the application. FIG. 6 shows a format example of the app operation change notification 601. For example, when a vehicle control application operating on the terminal 103 detects occurrence of an abnormality, such as an obstacle on a road surface found by an in-vehicle camera, and the application transitions to an emergency-mode state, the app operation change notification 601 shown in FIG. 6 is issued. The app operation change notification 601 is required to include at least an identifier ("App ID") for identifying the application and an operation state of the application after the change. Identifiers of applications, app operation states, and communication requirements for the application relating to the app operation state are managed by the app information database 405. Details of the app information database 405 are described later with reference to FIG. 9A.

Step S502: The management device 101 causes the event detection module 401 to receive the app operation change notification 601 transmitted from the terminal 103. The management device 101 refers to the app ID and the operation state of the application after the change, which are included in the app operation change notification 601, to update an app operation state table 902, which is described later in FIG. 9B, relating to a current application operation state held by the app information database 405. After that, the event detection module 401 transmits an instruction to start the calculation of the communication control method to the communication control method calculation module 402.

Step S503: The management device 101 causes the communication control method calculation module 402 to calculate the communication control method. After that, the management device 101 notifies the communication control device 102 of the calculated communication control method. Details of Step S503 are described later. In FIG. 5, the communication control devices 102 on a transmitting side and a receiving side are notified of the communication control method, but only the communication control device 102 on the transmitting side may be notified of the communication control method.

Step S504: The communication control device 102 switches the communication control method based on the communication control method received from the management device 101. At this time, information such as an IPv4 address and a port number included in the communication control method is used to identify traffic transmitted by an application to be subjected to communication control.

The above-mentioned processing procedure enables the detection of a change in the operation of the application and the communication control corresponding to the operation of the application. In the first embodiment, the communication control is performed after the operation change of the application. However, in order to reduce a time period during which there is a discrepancy between the application operation state and the communication requirements, the operation of the application may be changed after the switching of the communication control method. In that case, it suffices to add, after Step S504, the steps of notifying, after communication control is performed by the communication control module 408 of the communication control device 102, the control system cooperation module 409 of the terminal 103 of the switching of the communication control method and switching, by the terminal 103, the operation of the application after receiving the notification. In addition, not only in the case of a change in the operation of the application but also when the number of applications is changed, such as when an application for fail-safe is separately activated in an emergency mode, it is possible to perform the communication control by, for example, detecting, by the control system cooperation module 409 of the terminal 103 in Step S501, an increase or decrease in the number of applications through use of means such as monitoring process names and transmitting a notification (app operation change notification 601) that the operation has been changed to a stopped state or the like to each of the applications that have increased or decreased.

Details of a procedure for calculating the communication control method (Step S503) to be determined by the communication control method calculation module 402 of the management device 101 are described.

Figure 7:
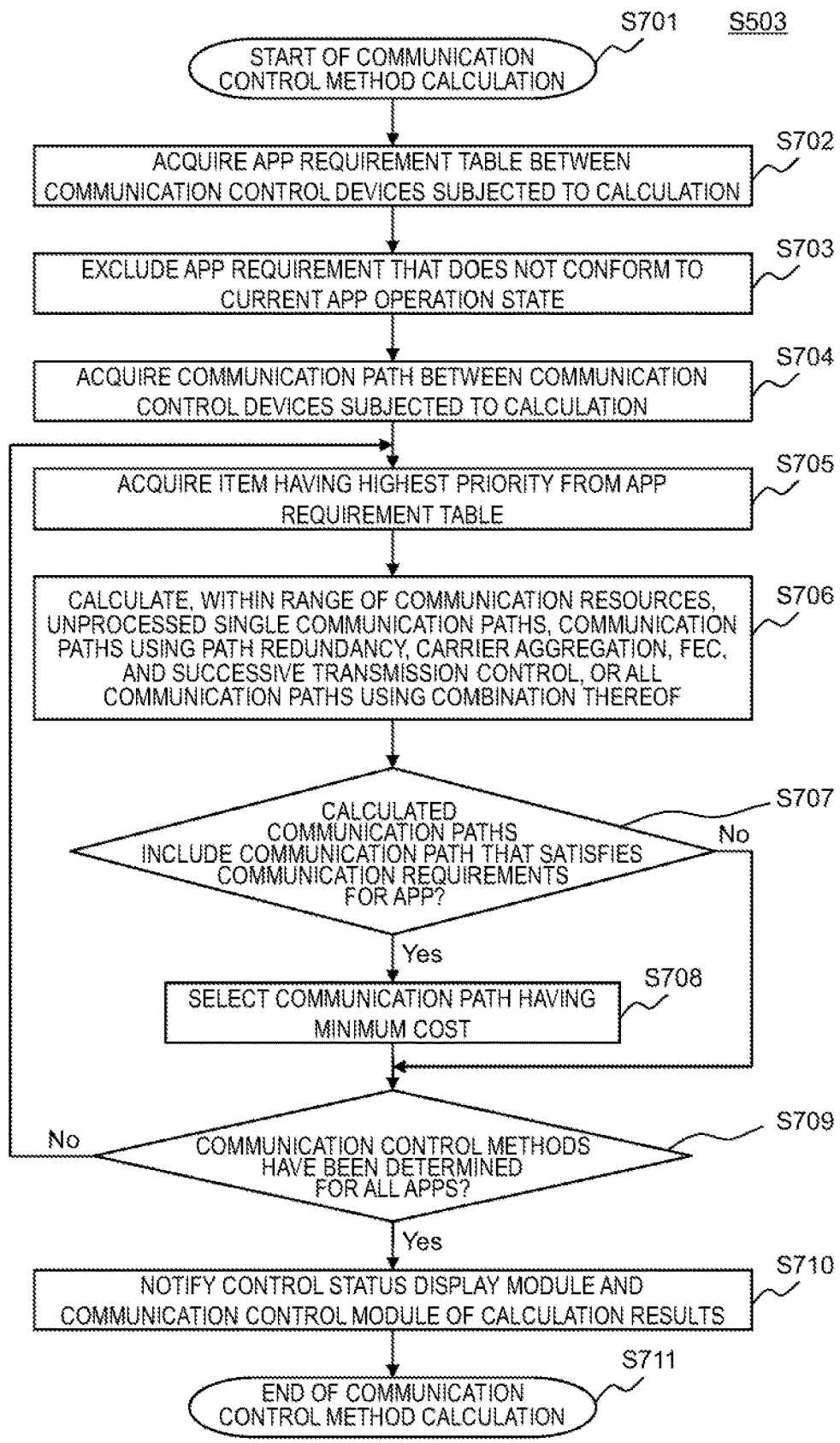
FIG. 7 is a flow chart for illustrating an example of a procedure for calculating a communication control method for performing a communication control at a minimum cost according to the first embodiment.

First Specific Example: Example of Performing Communication Control to Minimize Cost FIG. 7 is a flow chart for illustrating an example of a procedure for calculating the communication control method for performing the communication control at a minimum cost according to the first embodiment. Details of each processing step are described below.

Step S701: The calculation of the communication control method for traffic transmitted by all applications between the communication control devices 102 is started based on the communication requirements for the applications and communication quality information on communication paths. As the applications for which the communication control method is calculated, in consideration of a calculation time period and a situation in which high-priority applications cannot be accommodated, some applications such as an application for which the operation change has been notified of and newly added applications may be used.

Step S702: An app requirement table 901 of the applications that communicate between the communication control devices 102 subjected to the calculation is acquired from the app information database 405. The app requirement table 901 includes information (e.g., app identifier, communication segment, communication requirements, priority) for identifying an application to be subjected to the communication control and grasping specific details of communication. Specific examples of the app requirement table are described later with reference to FIG. 9A, FIG. 10, and FIG. 11.

Step S703: An app operation state table 902 (identifier of the application and application operation state) of the applications that communicate between the communication control devices 102 subjected to the calculation is acquired from the app information database 405. After that, each current application operation state is grasped by referring to the acquired app operation state table 902, and an item that does not correspond to the current app operation state is excluded from among the items included in the app requirement table 901 acquired in Step S702. A specific example of the app operation state table is described later with reference to FIG. 9A.

Step S704: A communication path table 1201 of the communication paths between the communication control devices 102 subjected to the calculation is acquired from the communication path database 406. The communication path table 1201 includes identification of a communication path and information (e.g., communication path identifier, communication quality, and cost) relating to the quality of the communication path. A specific example of the communication path table 1201 is described later with reference to FIG. 12.

Step S705: In order to perform the communication control in descending order of the priority of the application, the application having the highest priority is acquired, by referring to a priority item of the app requirement table 901, from among the applications for which the communication control method has not been determined. Different applications have different priorities, and hence there occurs no situation in which a plurality of applications are simultaneously taken into consideration. In addition, when the same application performs the same operation, the same priority may be set.

Step S706: Unprocessed (communication control being unapplied) single communication paths, communication paths using path redundancy for transmitting a packet to a plurality of communication paths, carrier aggregation for aggregating a plurality of communication paths for use, FEC for adding redundant information to a packet and enabling error correction on the receiving side, and successive transmission control for duplicating a packet within the same communication path, or all communication paths using a combination of the path redundancy, the carrier aggregation, the FEC, and the successive transmission control are calculated within a range of the communication resources. The communication resources correspond to a total value of available bandwidths (each having a value obtained by subtracting a bandwidth already allocated to an application from a maximum bandwidth allocated to the communication control device 102) of the communication paths that can be used in a target segment. The available bandwidths are managed within a program of the communication control method calculation module 402. As the available bandwidth, an initial value being the same as the maximum bandwidth is acquired from the communication path database 406, and after that, the value is updated every time the communication control method for each application is determined.

For example, a situation in which a maximum bandwidth of 50 megabits per second is allocated in a direction from the communication control device 102-A to the communication control device 102-B and Application A having a high priority and Application B having a low priority attempt communication at 30 megabits per second and 10 megabits per second, respectively, is assumed. When the communication control method for Application A is to be determined, the communication path is calculated within the communication resources corresponding to 50 megabits per second equal to the maximum bandwidth. When an unprocessed single communication path is allocated to Application A, the remaining communication resources correspond to 20 megabits per second (=(50 megabits per second)−(30 megabits per second)), and when the communication control method for Application B is to be determined, the communication path is calculated within the communication resources corresponding to 20 megabits per second. In the case of determining the communication control method for all applications, the initial value of the available bandwidth is equal to the maximum bandwidth allocated to the communication control device 102, but in the case of determining the communication control method for some applications, the total value of bandwidths allocated to those applications may be used as the initial value of the available bandwidth. In this manner, the communication control method is determined in descending order of the priority of the application, and hence when the communication requirements for the application cannot be satisfied even through use of all the communication resources, applications are accommodated so that the application having a higher priority is accommodated more preferentially and the accommodation of the application having a lower priority is stopped more preferentially.

In addition, all the communication paths calculated in Step S706 are the unprocessed single communication paths having minimum configurations and the communication paths calculated for all possible combinations of the above-mentioned redundancy technology and the like that can be assumed within a range that does not exceed the communication resources. For example, in the case of the successive transmission control, all patterns are calculated from the communication path with the number of times of successive transmission being 1 (successive transmission control being unapplied) to the communication path with the number of times of successive transmission being N (where N represents a maximum value allowed within the range of the communication resources). The communication paths using the path redundancy, the carrier aggregation, the FEC, and the successive transmission control or the communication paths using a combination thereof are calculated based on the information of the communication path table acquired in Step S704. Details of a method for the calculation are described later with reference to FIG. 15.

Step S707: It is determined based on the communication quality information (e.g., maximum bandwidth, latency, packet loss rate, and cost) whether or not the communication paths calculated in Step S706 include a communication path that satisfies the communication requirements (e.g., throughput, latency, packet loss rate, and upper limit of cost) for the application. This determination is performed based on a comparison in magnitude between numerical values of each communication requirement for the application and the corresponding item of the communication quality information (for example, it is determined that the communication requirement is satisfied when the latency of the communication path is smaller than the latency of the communication requirement for the application). When there is a communication path that satisfies the communication requirements for the application, the value of the available bandwidth of each communication path is updated, and then the process advances to Step S708. When there is no communication path that satisfies the communication requirements for the application, it is recorded that the application is not accommodated without performing the communication control, and the process advances to Step S709. An application that communicates bidirectionally is required to satisfy the communication requirements for the application in both directions, and when the communication requirements for the application are not satisfied even in one direction, it is determined that there is no communication path that satisfies the communication requirements for the application. Further, when a communication requirement for the application is given as a character string (for example, high security), the communication requirement is converted into a numerical value by a method determined by the user in advance, and the numerical value is compared in magnitude.

Step S708: A communication path having a minimum cost is selected from among the communication paths that satisfy the communication requirements for the application determined in Step S707. The cost is a demerit to be caused when the communication path is selected, and the value varies in magnitude depending on the communication path and communication control method to be used. Examples of the cost include the bandwidth to be used, monetary costs for the user and a system operator, and power consumption, and the cost may be determined from at least one of those. A specific example of the cost is described later with reference to FIG. 15. The cost minimization in Step S708 is one policy, and may be replaced by an item to be optimized as described later with reference to FIG. 8, or another index may be used.

Step S709: It is determined whether or not the communication control method has been determined for all the applications in the app requirement table 901 acquired in Step S702. When there is an application for which the communication control method has not been determined, the process returns to Step S705, and otherwise advances to Step S710.

Step S710: The control status display module 403 of the management device 101 and the communication control module 408 of the communication control device 102 are notified of the communication control methods determined in the steps of from Step S702 to Step S709. When the control status display module 403 receives the notification, the control status display module 403 presents the communication control methods to the user, and the communication control device 102 refers to the communication control methods to perform the communication control. The management device 101 may use the information of the communication path database 406 to select the most stable communication path and transmit a control command.

Step S711: The calculation of the communication control method for the traffic transmitted by the applications between the communication control devices 102 is ended based on the communication requirements for the applications and the communication quality information on the communication path.

In this manner, with the procedure for determining the communication control method according to the first specific example, the communication control method for the application is determined based on the communication requirements for the applications and the communication quality information on the communication path. When the communication path that satisfies the communication requirements for the application is to be determined, not only the unprocessed single communication paths but also the communication paths using technologies for improving the quality of the communication path, such as the path redundancy, the carrier aggregation, the FEC, and the successive transmission control, or using a combination thereof are calculated, and the communication path is selected from among those communication paths, thereby being capable of determining the communication control method including a case of using a communication path having a high communication quality. In addition, through the determination of the communication path in consideration of the cost, it is possible to perform cost-effective communication control while satisfying the communication requirements for the application.

Figure 8:
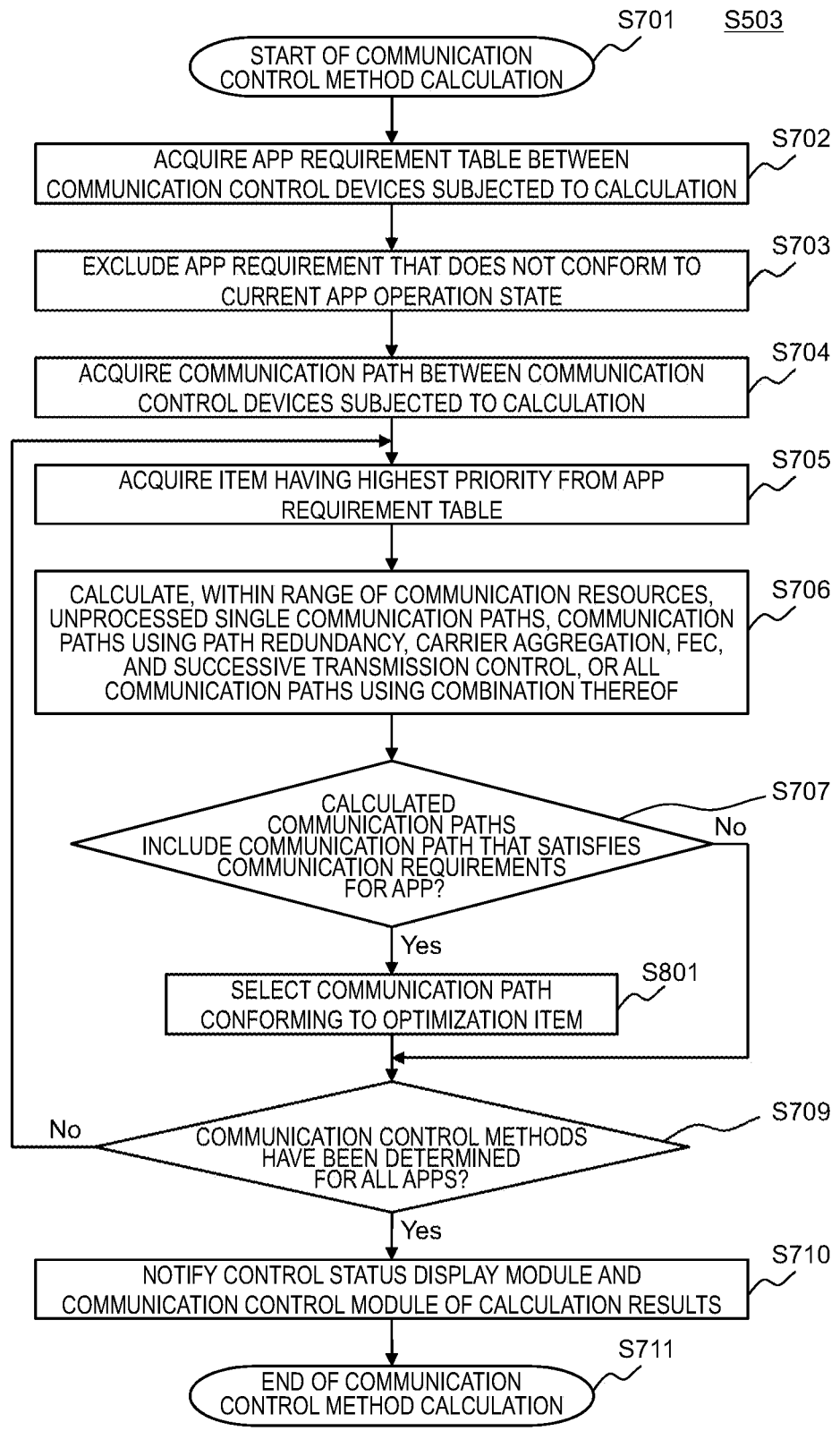
FIG. 8 is a flow chart for illustrating an example of a procedure for calculating the communication control method for performing a communication control conforming to an optimization item according to the first embodiment.

Second Specific Example: Example of Performing Communication Control Conforming to Optimization Item FIG. 8 is a flow chart for illustrating an example of a procedure for calculating the communication control method for performing the communication control conforming to an optimization item according to the first embodiment. The processing steps of from Step S701 to S707 and from Step S709 to S711 are the same as those of the procedure illustrated in FIG. 7, and hence descriptions thereof are omitted. Details of each processing step different from that of the procedure illustrated in FIG. 7 is described below.

Step S801: A communication path that matches the optimization item designated by the user is selected from among the communication paths that satisfy the communication requirements for the application determined in Step S707. Examples of the optimization items include minimization of the latency, minimization of the packet loss rate, and maximization of the throughput. The optimization items are set in advance in an app requirement table 901 of the app information database 405. A specific example of the optimization items is described later with reference to FIG. 11.

In this manner, the communication path is determined in consideration of the optimization item set in advance by the user, to thereby enable the communication control even when cost efficiency is not maximized. Thus, for example, requests for reducing communication latency over the cost and maximizing the bandwidth over the cost can be met.

Figure 9B:
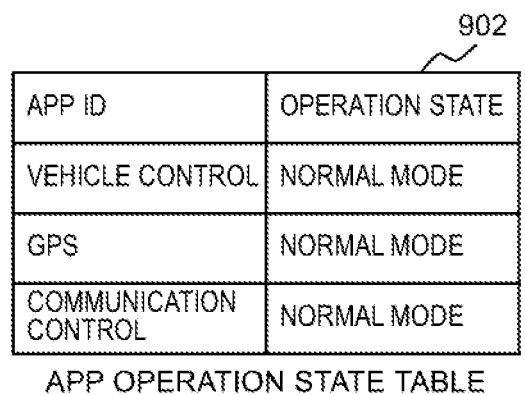

FIG. 9A and FIG. 9B are diagrams for illustrating examples of structure of tables managed by the app information database 405 according to the first embodiment. FIG. 9A and FIG. 9B involve both the direction from the communication control device 102-A to the communication control device 102-B and the opposite direction.

The app requirement table 901 shown in FIG. 9A includes an identifier ("App ID") of an application, an identifier ("OPERATION TYPE") of an operation of the application for identifying communication requirements for the operation of the application, information ("SOURCE DEVICE ID" and "DESTINATION DEVICE ID") for associating the application with a communication segment, information ("SOURCE IPv4:PORT" and "DESTINATION IPv4:PORT") for identifying the application at a time of communication control, communication requirements ("THROUGHPUT," "LATENCY," "PACKET LOSS RATE," and "COST UPPER LIMIT) for the application, and a priority in communication resource allocation order. The app requirement table 901 holds the communication requirements for each application corresponding to each operation of the application, and hence it is possible to calculate the communication control method corresponding to the operation of the application. As the information for identifying the application at the time of communication control, an IPv6 address, original information included in a payload of a packet transmitted by the application, and the like may be used. Items requested by the user for the communication path, such as security, environmental load, and availability, may be added to the communication requirements for the application, and items that are not required may be reduced. In addition, the app requirement table 901 may be divided into a plurality of sections, for example, divided based on communication directions or communication control devices at a source and a destination.

The app operation state table 902 shown in FIG. 9B includes an identifier ("App ID") of an application and information ("OPERATION STATE") indicating the current app operation state corresponding to the identifier of the operation of the application. It is possible to grasp, by referring to the app operation state table 902, the current application operation state and calculate the communication control method based on the current status. The app requirement table 901 and the app operation state table 902 may be integrated by, for example, adding an item of a current state to the app requirement table 901.

FIG. 10 is a diagram for illustrating an example of structure of a table managed by the app information database 405 for a case in which a plurality of different types of traffic are transmitted by each application.

When the application transmits a plurality of types of traffic having different communication requirements, as shown in an app requirement table 1001, an identifier ("DATA TYPE") indicating a traffic type is added to the app requirement table in order to identify communication requirements for each traffic type, to thereby enable the communication control. At a time of actual communication control, the communication control device 102 identifies the application and the data type of the traffic by, for example, including information corresponding to the data type in a payload of a packet. When a different priority for each data type is defined in the priority item, it is possible to perform communication control in which control traffic having a high importance degree is prioritized over video traffic having a low importance degree.

FIG. 11 is a diagram for illustrating an example of structure of a table managed by the app information database 405 for a case of performing the communication control corresponding to the optimization item.

In a case of following the optimization item illustrated in the flow chart of FIG. 8, the optimization item of the app requirement table 1101 enables the communication control. In each optimization item, communication quality information (e.g., throughput, latency, or cost) and information indicating that the communication quality information is to be maximized or minimized are described. When two or more optimization items are required, it suffices to additionally manage the second item to be optimized.

FIG. 12 is a diagram for illustrating an example of structure of a table managed by the communication path database 406 according to the first embodiment.

The communication path table 1201 includes an identifier ("COMMUNICATION PATH ID") of a communication path, information ("SOURCE DEVICE ID" and "DESTINATION DEVICE ID") for associating the communication path with a communication segment, and communication quality information ("MAXIMUM BANDWIDTH," "LATENCY," "PACKET LOSS RATE," "POWER CONSUMPTION," "USAGE FEE," AND "COST") for determining whether or not the communication path satisfies the communication requirements for the application. Not only the communication quality information is directly input by the user, but information measured by the communication path quality measurement module 407 of the communication control device 102 may also be collected by the management device 101 for use as the communication quality information. The communication quality information may also be collected by the management device 101 from an external system or the like through the network. As the measurement, any one of a direct measurement or an indirect measurement can be employed. In the direct measurement, the communication quality information is directly measured by, for example, measuring the latency through use of an internet control message protocol (ICMP). In the indirect measurement, the communication quality information is estimated by, for example, collecting signal-to-noise ratios (SNRs) measured by a wireless communication interface of the terminal 103 and converting the collected SNRs into the maximum bandwidth. In a case of using the indirect measurement, it suffices that at least one of the management device 101 or the communication control device 102 holds a communication path quality calculation function shown in FIG. 13 and the measured information is converted into the communication quality information at a time of registration in the communication path database 406 or at a time of the calculation of the communication control method. The communication path quality calculation function shown in FIG. 13 is merely an example. For example, the maximum bandwidth may be calculated from the number of users coupled to the wireless base station, the packet loss rate and the maximum bandwidth may be calculated from strength of received radio waves, and the latency may be calculated from a date and time and location information. It is also possible to use functions different for each communication path.

The communication quality information is not limited to constants, and, as shown in communication quality information (function formats) of FIG. 14, may have function formats such as a function for managing the latency based on a probability distribution function and a function for calculating the cost from the number of transmitted bytes. The communication quality information shown in FIG. 14 is an example. The communication quality information may be, for example, a function for calculating the cost from the power consumption and the number of transmitted bytes.

Further, the management device 101 may use the information of the communication path database 406 to select the most stable communication path and collect the communication quality information therefrom.

FIG. 15 is a diagram for illustrating examples of the communication path calculated by the communication control method calculation module 402 of the management device 101. In order from the top of a calculated communication path list 1501 of FIG. 15, the first to third communication paths are unprocessed single communication paths, and the fourth and subsequent communication paths are communication paths calculated from the unprocessed single communication paths through use of the path redundancy, the carrier aggregation, the FEC, or the successive transmission control. The fourth communication path is a communication path to which the successive transmission control (using two successive transmissions of packets and LTE) is applied, the fifth communication path is a communication path to which the FEC (using coding rate of 3/5 and LTE) is applied, the sixth communication path is a communication path to which the carrier aggregation (using LTE and 5G) is applied, and the seventh communication path is a communication path to which the path redundancy (using LTE and 5G) is applied. The program of the communication control method calculation module 402 manages a calculation method regarding amounts of changes in the communication quality (e.g., maximum bandwidth, latency, and packet loss rate) and the cost exhibited when each communication control method is applied to the communication path, and can calculate, by the managed calculation method, the communication path using a communication control method or using communication control methods in combination. The above-mentioned calculation method can be defined by a method of, for example, causing the user to input the calculation method in advance to the communication control method calculation module 402 through the input interface 203 of the management device 101 or causing a file storing the calculation method to be read. The calculation method described above may be changed during the operation of the communication control system.

The calculation method of calculating each communication path from an unprocessed single communication path according to the first embodiment is described. Values of respective pieces of communication quality information described below are values based on the application to which the communication control has not been applied. For example, in a case in which successive transmission control (two successive transmissions) is applied to a communication path originally having a maximum bandwidth of 50 megabits per second, the application to which the communication control has not been applied requires twice the bandwidth after the communication control is applied thereto, and hence the calculated maximum bandwidth of the communication path is 25 megabits per second, which is half of the original maximum bandwidth of the communication path.

Communication Path to which Successive Transmission Control is Applied: In this communication path, only a communication path of LTE is used, and a packet is duplicated and subjected to two successive transmissions, thereby being capable of using a high-quality communication path having a low packet loss rate. The maximum bandwidth is set to half of the maximum bandwidth of LTE due to the duplication of a packet and the two successive transmissions thereof. In regard to the latency, when a loss of a packet has occurred, it is required to wait for the subsequent packet, and hence an average value of the latency slightly increases, but an amount of the increase is considered to be negligible. Thus, the latency is set to have the same value as the value of the latency of LTE. In regard to the packet loss rate, on the assumption that the probability of losing each packet is independent, the packet loss rate is set to a value obtained by raising the value of the packet loss rate of LTE to the second power, where the ordinal number corresponds to the number of successive transmissions. In regard to the cost, an amount of communication increases in proportion to the number of successive transmissions due to the successive transmissions of packets at a usage fee (yen/megabyte) of pay-as-you-go billing, and hence the cost is set to double the cost of LTE.

Communication Path to which FEC is Applied: In this communication path, only a communication path of LTE is used, and a payload portion of a packet is processed with an error correcting code added thereto, thereby being capable of using a high-quality communication path having a low packet loss rate. In regard to the maximum bandwidth, on the assumption that a usable bandwidth decreases in accordance with an amount of the added redundant information, the maximum bandwidth is set to have a value obtained by multiplying the maximum bandwidth of LTE by the coding rate. The latency slightly increases due to transmission of the redundant information, but the amount of the increase is considered to be negligible, and hence the latency is set to be the same as the latency of LTE. In regard to the packet loss rate, on the assumption that 1% of error packets that originally occur in LTE cannot be error-corrected by the error correcting code, the packet loss rate is set to have a value obtained by multiplying the packet loss rate of LTE by 0.01. In regard to the cost, the amount of communication increases in accordance with the coding rate at the usage fee (yen/megabyte) of the pay-as-you-go billing, and hence the cost is set to have a value obtained by multiplying the cost of LTE by the reciprocal of the coding rate.

Communication Path to which Carrier Aggregation is Applied: In this communication path, communication paths of LTE and 5G are used in combination, and a high-quality communication path having a large maximum bandwidth through use of the two communication paths in combination is generated. The maximum bandwidth is set, due to the use of the two communication paths in combination, to have a total value of the maximum bandwidth of LTE and the maximum bandwidth of 5G. As the latency, the packet loss rate, and the cost, on the assumption that packets are basically alternately transmitted through two paths, average values of the respective values of LTE and the respective values of 5G are used. As a method of distributing packets to the respective communication paths, it is possible to use any method of, for example, giving priority to LTE or changing a distribution ratio depending on a ratio of the maximum bandwidth.

Communication Path to which Path Redundancy is Applied: In this communication path, communication paths of LTE and 5G are used in combination, and a packet is duplicated and packets obtained through the duplication are transmitted to the respective communication paths in a redundant manner, thereby being capable of using a high-quality communication path having a low packet loss rate. In regard to the maximum bandwidth, the respective communication paths are required to have the same bandwidth due to the transmission of the same packet to the respective communication paths in a redundant manner, and hence the communication path having the smallest maximum bandwidth becomes a bottleneck. Therefore, of the values of the maximum bandwidth of LTE and 5G, the value of LTE, which has the smaller maximum bandwidth, is used. In regard to the latency, the average value of the latency slightly increases due to the waiting of a packet in LTE when a loss of a packet has occurred in 5G, which has the smaller latency, but the amount of the increase is considered to be negligible, and hence the latency is set to be the same as the latency of 5G. In regard to the packet loss rate, on the assumption that the probability of losing each packet is independent, the packet loss rate is set to have a value obtained by raising the value of the packet loss rate of LTE to the second power, where the ordinal number corresponds to the number of redundant paths. In regard to the cost, the communication paths of LTE and 5G are simultaneously used, and hence the cost is set to have a total value of the cost of LTE and the cost of 5G.

When the above-mentioned concepts are used in combination, it is also possible to create a higher-quality communication path that uses two or more of the path redundancy, the carrier aggregation, the FEC, and the successive transmission control in combination.

The calculation method for the processing of calculating the communication paths (Step S706) described above is an example, and can be freely set by the user because the calculation method varies depending on the characteristics of the communication paths and the configuration of the network. Further, in the case of determining the communication control method for a plurality of applications, the maximum bandwidth in the calculated communication path list 1501 may be read as the available bandwidth.

FIG. 16A and FIG. 16B are diagrams for illustrating examples of the communication control method determined by the communication control method calculation module 402 of the management device 101 according to the first embodiment. The communication control method according to the first embodiment is determined so as to minimize the cost.

A communication control method 1601-A is a communication control method with the operation state of a vehicle control app being a normal mode, and a communication control method 1601-B is a communication control method with the operation state of the vehicle control app being an emergency mode. Information held by the communication control methods 1601-A and 1600-B does not change depending on the application operation state, and includes an identifier ("App ID") of an application, an identifier ("OPERATION STATE") of an operation of the application, information ("ACCOMMODATABILITY") on whether or not to perform the communication control for the application, information ("SOURCE DEVICE ID" and "DESTINATION DEVICE ID") for associating the application with a communication segment, information ("SOURCE IPv4:PORT" and "DESTINATION IPv4:PORT") for identifying the application at the time of the communication control, information indicating whether or not to apply each of the path redundancy, the carrier aggregation, the FEC, and the successive transmission control, and traffic allocation. The identifier of the application, the identifier of the operation of the application, the information for associating the application with the communication segment, and the information for identifying the application at the time of the communication control are the same as those of the information shown in the app requirement table 901 of the app information database 405. The communication control device 102 uses information regarding an application for which the communication control is to be performed, such as the source IPv4 address, the source port, the destination IPv4 address, and the destination port, to identify the traffic transmitted by the application to be subjected to the communication control. When it is determined that the traffic is to be subjected to the communication control, the communication control is performed by referring to the information indicating whether or not to apply each of the path redundancy, the carrier aggregation, the FEC, and the successive transmission control and the information on the traffic allocation.

FIG. 17 is a diagram for illustrating an example of a screen to be displayed by the control status display module 403 according to the first embodiment.

In a communication path status 1701, part or all of the communication path information held by the communication path database 406 is displayed. This allows the user to quickly and visually grasp the communication quality information on each communication path.

In a communication control status 1702, part or all of the communication control method 1601 calculated by the management device 101 is displayed. This allows the user to quickly and visually grasp the communication control that is currently being performed.

FIG. 18 is a diagram for illustrating an example of an input screen to be used by the input module 404 according to the first embodiment.

A new communication path input part includes a communication path input form 1801 for inputting items for registering a new communication path in the communication path database 406, and a communication path DB registration button 1802 for registering the input details in the communication path database 406. The details of the communication path input form 1801 correspond to the details of the communication path table 1201 of the communication path database 406. New communication path information can be registered in the communication path database 406 through use of the new communication path input part in a quick and easy-to-understand manner.

A new app input part includes an app information input form 1803 for inputting items for registering new app information in the app information database 405 and an app information DB registration button 1804 for registering the input details in the app information database 405. The details of the app information input form 1803 correspond to the details of the app requirement table 901 of the app information database 405. New application information can be registered in the app information database 405 through use of the new app input part in a quick and easy-to-understand manner.

The new communication path input part and the new app input part not only allow new application to be added but also the already registered information to be updated.

Second Embodiment

A second embodiment of this invention is described. According to the second embodiment, a case in which communication control is performed with a trigger of external information input is described with reference to FIG. 19, FIG. 20, and FIG. 21. Except a software configuration of each device illustrated in FIG. 19, communication control processing at a time of the external information input illustrated in FIG. 20, and an app operation change detection table shown in FIG. 21, various configurations, processing, and the like regarding the second embodiment are the same as those according to the first embodiment, and hence descriptions thereof are omitted.

Figure 19:
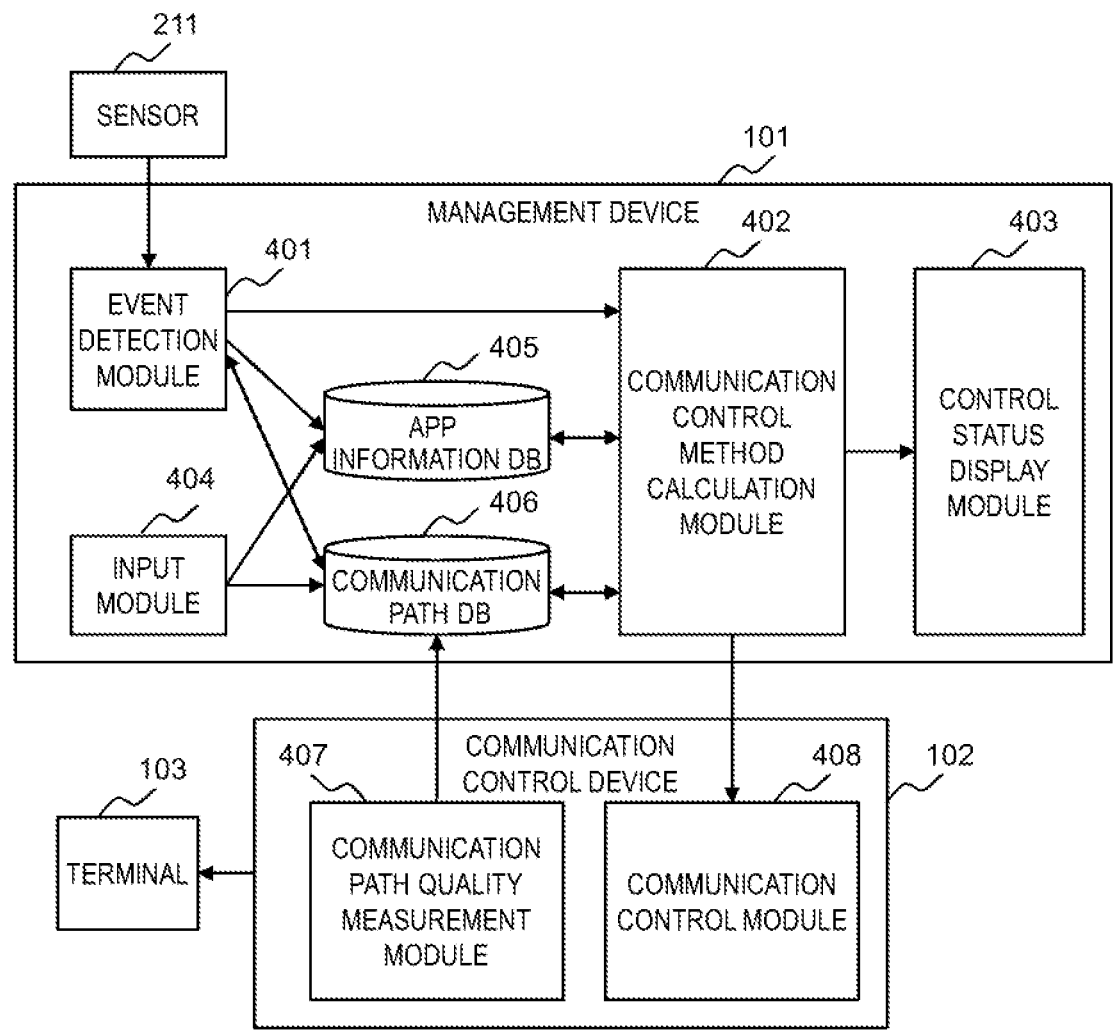
FIG. 19 is a block diagram for illustrating an example of a software configuration of each device according to a second embodiment.

FIG. 19 is a block diagram for illustrating an example of a software configuration of each device according to the second embodiment. According to the second embodiment, the terminal 103 does not include the control system cooperation module 409 unlike according to the first embodiment illustrated in FIG. 4. This is a case in which, for example, the terminal 103 does not include the control system cooperation module 409 due to difficulty in loading software to the terminal 103. According to the first embodiment, the app operation change notification 601 transmitted from the control system cooperation module 409 of the terminal 103 is used to detect the operation change of the application, and hence in the above-mentioned case, it is difficult to perform the communication control at the time of the operation change of the application.

Figures 20, 21:
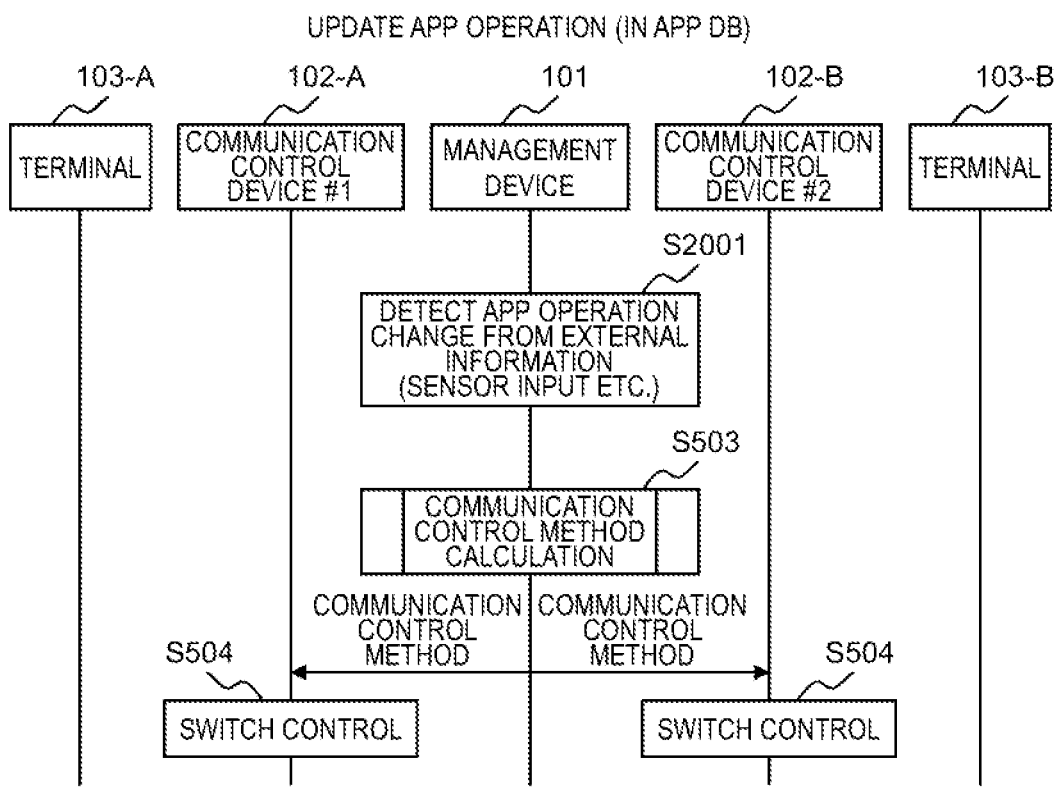
FIG. 20 is a sequence diagram for illustrating an example of communication control processing to be performed with a trigger of the external information according to the second embodiment.
FIG. 21 is a diagram for illustrating an example of an app operation change detection table to be used at a time of detecting the operation change of the application from the extremal information according to the second embodiment.

In order to solve the above-mentioned problem, according to the second embodiment, the event detection module 401 receives input from the sensor 211 as illustrated in FIG. 19. The operation of an application is often changed with a trigger of some kind of input from the outside, such as a change in environment or location, a change in time, or manual input. Therefore, the event detection module 401 associates some condition set by the user, such as a condition that a sensor value (for example, time, location information, acceleration, brightness, sound, image, vibration, or angular velocity) acquired by the sensor 211 exceeds a threshold value, and the sensor value with the event for the operation change of the application, thereby being capable of achieving the communication control corresponding to the operation change of the application. Conditions that associate the external information with the operation change of the application may be managed in an app operation change detection table 2101 of the app information database 405. Details of the app operation change detection table 2101 are described later with reference to FIG. 21. A change in the operation of the application may be detected with a trigger of external information (for example, Web text, text manually input through a keyboard, or notification from an external system) other than the sensor value acquired by the sensor 211. In addition, the extremal information may be passively or actively collected by the event detection module 401 of the management device 101 from the sensor 211 at a remote location through a communication network at a predetermined timing (for example, at regular intervals). FIG. 20 is an illustration of a specific communication control processing procedure.

FIG. 20 is a sequence diagram for illustrating an example of communication control processing to be performed with a trigger of the external information according to the second embodiment.

Step S502 to Step S504 are the same as those of the procedure illustrated in FIG. 5, and descriptions thereof are therefore omitted. Unlike according to the first embodiment in which the communication control is performed with a trigger of the app operation change notification 601, the communication control is performed with a trigger of processing (Step S2001) for detecting, by the event detection module 401, the operation change of the application based on the external information input. This enables the communication control even when the terminal 103 does not include the control system cooperation module 409. The operation change of the application is detected by referring to the app operation change detection table 2101 of the app information database 405. A specific procedure for detecting the operation change of the application is described later with reference to FIG. 21.

FIG. 21 is a diagram for illustrating an example of the app operation change detection table 2101 to be used at a time of detecting the operation change of the application from the external information according to the second embodiment. The app operation change detection table 2101 may be provided in the event detection module 401. The app operation change detection table 2101 includes an identifier ("App ID") of an application, operation states before and after an operation change of the application, an information source for identifying external information, and a change detection condition for detecting the operation change of the application from the external information. First, the event detection module 401 identifies an information source (in-vehicle camera or the like) of information input from the outside through use of information such as a communication interface (for example, IPv4 address, port number, serial port, and device file) through which the external information has been input. After that, it is determined whether or not the operation of the application has been changed by referring to the change detection condition regarding the identified information source. Processing corresponding to the change detection condition may be defined by a method of, for example, causing the user to input the processing in advance to the event detection module 401 through the input interface 203 of the management device 101 or causing a file storing the change detection condition to be read. When the change detection condition is satisfied, the "App ID" and the operation status item after the change are referenced to update the operation of the application (Step S503).

FIG. 21 is an example, and as the change detection condition, it is possible to use any condition, for example, that the sensor value exceeds the threshold value or that an obstruction has been detected by a camera. When the operating state before the change and the current application operation state are the same, it is not required to change the communication control method, and hence Step S502 and the subsequent processing steps are not required to be performed. Further, the change detection condition may be changed during the operation of the communication control system.

Third Embodiment

A third embodiment of this invention is described. According to the third embodiment, a case in which communication control is performed with a trigger of a communication path change is described with reference to FIG. 22 and FIG. 23. Except communication control processing at a time of the communication path change illustrated in FIG. 22 and a communication path change detection table shown in FIG. 23, various configurations, processing, and the like regarding the third embodiment are the same as those according to the first embodiment, and hence descriptions thereof are omitted.

According to the first embodiment and the second embodiment, the communication control can be performed when a change in the operation of an application is detected. Therefore, when a change has occurred in the communication path, for example, the communication path has deteriorated, even without a change in the operation of the application, there occurs a case in which the communication control is not performed, thereby failing to satisfy the communication requirements for the application.

Figures 22, 23:
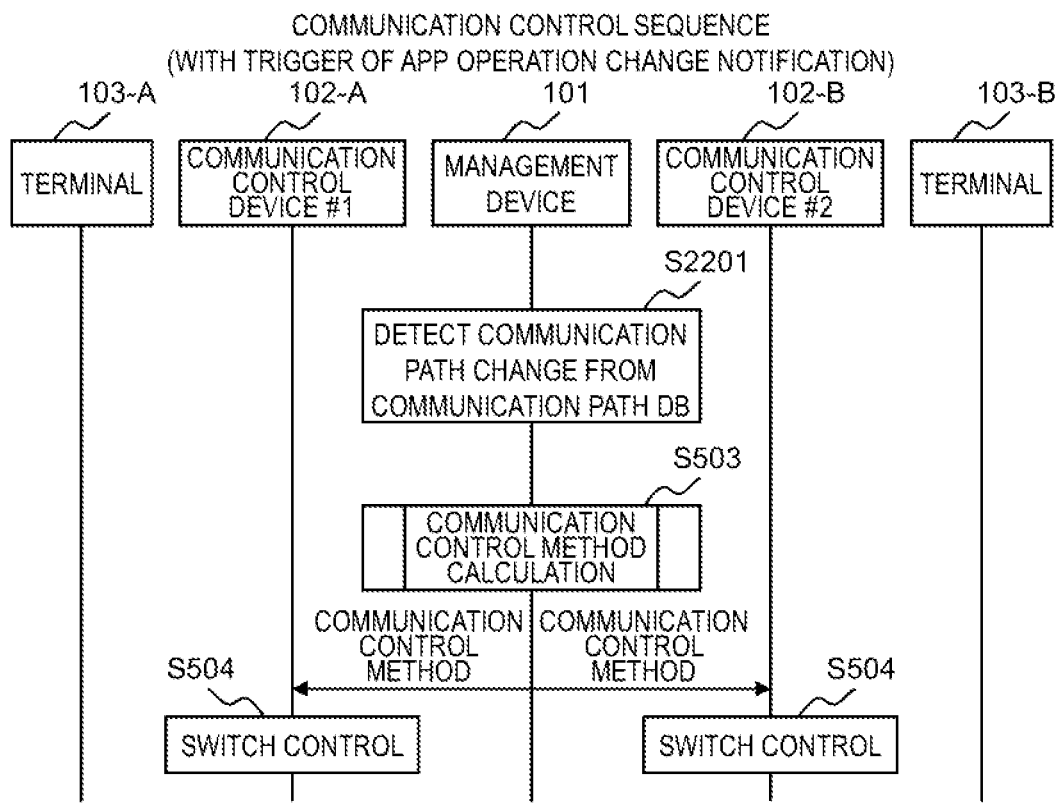
FIG. 22 is a sequence diagram for illustrating an example of a communication control processing procedure to be performed with a trigger of a communication path change according to a third embodiment.
FIG. 23 is a diagram for illustrating an example of the communication path change detection table to be used at a time of detecting a communication path change according to the third embodiment.

In order to solve the above-mentioned problem, it is effective to provide an extension that enables the event detection module 401 to detect a communication path change. Specifically, when the event detection module 401 accesses the communication path database 406 at a predetermined timing (for example, periodically) and detects a change in the communication path, the event detection module 401 instructs the communication control method calculation module 402 to start the calculation of the communication control method. It may be determined whether or not there is a change in the communication path based on a change in the value of the communication quality information, for example, based on whether or not a value measured at a previous sampling timing has been changed by a certain ratio or more. Conditions for determining a change in the communication path are managed in a communication path change detection table 2301 of the communication path database 406. Details of the communication path change detection table 2301 are described later with reference to FIG. 23. A trigger for the detection regarding the communication path change is not limited to the above-mentioned example, and may be, for example, a mode of detecting a change in the communication path based on a change in a freely-set index such as deterioration of a radio field intensity. FIG. 22 is an illustration of a specific communication control processing procedure.

FIG. 22 is a sequence diagram for illustrating an example of a communication control processing procedure to be performed with a trigger of a communication path change according to the third embodiment.

Step S503 and Step S504 are the same as those of the procedure illustrated in FIG. 5, and descriptions thereof are therefore omitted. In Step S2201, the event detection module 401 refers to the communication path table 1201 and the communication path change detection table 2301 of the communication path database 406 to execute processing for detecting a communication path change, and when the communication path change has been detected, instructs the communication control method calculation module 402 to start the calculation of the communication control method. This enables the communication control even when there is a change in the communication path.

FIG. 23 is a diagram for illustrating an example of the communication path change detection table 2301 to be used at a time of detecting a communication path change according to the third embodiment. The communication path change detection table 2301 is formed of a communication path ID for identifying a communication path, a reference index being an item of the communication path table 1201 to be referred to at the time of detecting a change, and a change detection condition being a condition for detecting a communication path change based on the reference index. The event detection module 401 acquires the communication quality information from the communication path table 1201 based on the items of the communication path ID and the reference index, and examines whether or not the acquired value satisfies the change detection condition, thereby being capable of determining whether or not a communication path change has occurred. Processing corresponding to the change detection condition is defined by a method of, for example, causing the user to input the processing in advance to the event detection module 401 through the input interface 203 of the management device 101 or causing a file storing the change detection condition to be read.

FIG. 23 is an example, and a condition for detecting a change may be set for a freely-selected communication path. As the change detection condition, it is possible to use any condition, for example, that the value of the latency has been changed by 10% or more from the previous sample or that a machine learning algorithm for detecting communication congestion based on the packet loss rate has detected a congested state. Further, the change detection condition may be changed during the operation of the communication control system.

As described above, the management device 101 according to the at least one embodiment of this invention includes the event detection module 401 that detects, as an event, one of an operation change, an increase, or a decrease of an application which is accompanied by a change in the communication requirements, the app information database 405 that manages the communication requirements for each operation of the application, the communication path database 406 that manages the communication quality of each communication path, and the communication control method calculation module 402 that determines, by referring to the app information database 405 and the communication path database 406, the communication control method that satisfies the communication requirements for the application from which the event has been detected, and notifies the communication control device 102 of the determined communication control method. Therefore, it is possible to select, depending on the operation of the application, the communication path that satisfies the communication requirements corresponding to the operation of the application.

Further, the communication control method calculation module 402 determines the communication control method including path redundancy control for transmitting the same packet to a plurality of communication paths, carrier aggregation control for transmitting packets to a plurality of communication paths in a distributed manner, error correction control for adjusting a packet coding rate, and successive transmission control for duplicating a packet and transmitting packets obtained through the duplication to a single communication path. Therefore, it is possible to accurately select the communication path that satisfies the communication requirements from a wide range of communication qualities.

Further, the communication path database 406 manages the cost determined from at least one of a fee or a power consumption amount involved in use of the communication path, and the communication control method calculation module 402 determines the communication control method satisfying the communication requirements for the application and having the lowest cost. Therefore, it is possible to provide an efficient communication path, for example, having low power consumption.

Further, the communication control method calculation module 402 determines, when the communication requirements for the application fail to be satisfied even through use of all the communication resources, the communication control method in descending order of the priority of the application. This causes communication of the application having a higher priority to be accommodated in the communication path, and can stop accommodation of communication of the application having a lower priority in the communication path. Therefore, it is possible to accommodate the application having a higher importance degree more preferentially in the communication path and stop the accommodation of communication of the application having a lower importance degree.

Further, the communication quality information managed by the communication path database 406 is updated based on measured information obtained by the communication control device 102 periodically measuring the communication quality of each communication path. Therefore, it is possible to accurately grasp the state of the communication path through periodic measurement.

Further, the input module 404 that receives input of the communication requirements for the application to be managed by the app information database 405 and the communication quality and the cost of the communication path to be managed by the communication path database 406 is provided. Therefore, it is possible to easily update the data in the database.

Further, the control status display module 403 that outputs the communication quality information managed by the communication path database 406 and the communication control method determined by the communication control method calculation module 402 is provided. Therefore, an operator can accurately grasp the status of the communication path.

Further, the event detection module 401 detects the event based on input from the sensor 211 or an external system. Therefore, it is possible to quickly detect the event before the communication path status changes.

Further, the event detection module 401 detects, as the event, a change in the communication quality information managed by the communication path database 406 which conforms to a predetermined condition. Therefore, it is possible to provide an appropriate communication path even when a change has occurred in the communication path.

Further, the communication control method calculation module 402 determines the communication control method that satisfies the communication quality of the application for each data type. Therefore, it is possible to provide an appropriate communication path in accordance with the application operation state.

Further, the communication control method calculation module 402 determines the communication control method that satisfies the communication requirements for the application so as to maximize or minimize the item of the communication quality that the user wishes to optimize. Therefore, it is possible to select an appropriate communication path in accordance with the operation state based on an index other than the cost, and to select an appropriate communication path when the cost is not required to be taken into consideration.

Further, the communication path database 406 manages the communication quality information in a format of a probability distribution function. Therefore, it is possible to appropriately manage even the item of the communication quality that is difficult to be managed as a single value while including ambiguity thereof.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A management device for selecting a communication path between a vehicle and a communication network that improves reliability, the management device comprising:
   a communication interface that communicatively couples to the communication network;
   a memory; and
   one or more processors that are communicatively coupled to the communication interface and the memory, wherein the one or more processors are collectively configured to:
      detect an occurrence of an abnormality in the vehicle using in-vehicle camera,
      in response to the occurrence, set a priority for a vehicle control app to an emergency-mode,
      increase, communication requirements for the vehicle control app based on the emergency-mode,
      determine, by referring to app information and communication path information stored in the memory, a communication control method that satisfies the communication requirements for the vehicle control app, and
      configure the communication interface according to communication control method for the vehicle control app to communicate with the communication network.

2. The management device according to claim 1, wherein the one or more processors are further collectively further configured to:
   determine the communication control method including path redundancy control for transmitting the same packet to a plurality of communication paths, carrier aggregation control for transmitting packets to a plurality of communication paths in a distributed manner, error correction control for adjusting a packet coding rate, and successive transmission control for duplicating a packet and transmitting packets obtained through the duplication to a single communication path.

3. The management device according to claim 1,
   wherein the communication path information manages a cost determined from at least one of a fee or a power consumption amount involved in use of the communication path, and
   wherein the one or more processors are further collectively configured to:
   determine the communication control method satisfying the communication requirements for the vehicle control app and having a lowest cost.

4. The management device according to claim 1,
   wherein the app information manages information on a priority of a plurality of applications, and
   wherein the one or more processors are further collectively configured to:
   determine, when the communication requirements for a respective application among the plurality of applications fail to be satisfied even through use of all communication resources, the communication control method in descending order of the priority of the respective application, to thereby cause communication of the respective application having a higher priority to be accommodated in the communication path and stop accommodation of communication of the respective application having a lower priority in the communication path.

5. The management device according to claim 1, wherein the management device is configured to update communication quality information managed by the communication path information based on measured information obtained periodically measuring a respective communication quality of each communication path.

6. The management device according to claim 1, wherein the one or more processors are further collectively configured to:
   receive input of the communication requirements for a plurality of applications to be managed by the app information and communication quality and a cost of the communication path to be managed by the communication path information.

7. The management device according to claim 1, further comprising a control status display module configured to output communication quality information managed by the communication path information and the communication control method determined.

8. The management device according to claim 1, wherein the abnormality is an obstacle on a road surface in a path of the vehicle.

9. The management device according to claim 1,
   wherein the app information manages the communication requirements different for each data type, and
   wherein the one or more processors are further collectively configured to determine the communication control method that satisfies communication quality of an application among a plurality of applications for each data type.

10. The management device according to claim 1,
    wherein the app information manages an item of communication quality that a user wishes to optimize, and
    wherein the one or more processors are further collectively configured to:
    determine the communication control method that satisfies the communication requirements for an application among a plurality of plurality of applications so as to achieve one of maximization or minimization of the item of the communication quality that the user wishes to optimize.

11. The management device according to claim 1, wherein the communication path information manages communication quality information in a format of a probability distribution function.

12. A method for selecting a communication path between a vehicle and a communication network that improves reliability
    the method comprising
    detecting an occurrence of an abnormality in the vehicle using in-vehicle camera;
    in response to the occurrence, setting a priority for a vehicle control app to an emergency-mode,
    increasing communication requirements for the vehicle control app based on the emergency-mode;
    determining by referring to app information and communication path information stored in a memory, a communication control method that satisfies the communication requirements for the vehicle control app; and
    controlling communication of the vehicle control app based on the communication control method.

13. A non-transitory computer readable storage medium storing instructions for selecting a communication path between a vehicle and a communication network that improves reliability, the instructions when executed by a processor cause the processor to execute a method comprising:
  detecting an occurrence of an abnormality in the vehicle using in-vehicle camera; in response to the occurrence, setting a priority for a vehicle control app to an emergency-mode,
  increasing communication requirements for the vehicle control app based on the emergency-mode;
  determining by referring to app information and communication path information stored in a memory, a communication control method that satisfies the communication requirements for the vehicle control app; and
  controlling communication of the vehicle control app based on the communication control method.

* * * * *